United States Patent
Ma et al.

(10) Patent No.: US 12,363,576 B2
(45) Date of Patent: Jul. 15, 2025

(54) DIFFERENTIAL MODE FOR INTERFERENCE-SPECIFIC CHANNEL STATE INFORMATION REPORT

(71) Applicant: QUALCOMM INCORPORATED, San Diego, CA (US)

(72) Inventors: Ruifeng Ma, Beijing (CN); Bo Chen, Beijing (CN); Yu Zhang, San Diego, CA (US); Jay Kumar Sundararajan, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/915,381

(22) PCT Filed: May 13, 2020

(86) PCT No.: PCT/CN2020/089971
§ 371 (c)(1),
(2) Date: Sep. 28, 2022

(87) PCT Pub. No.: WO2021/226863
PCT Pub. Date: Nov. 18, 2021

(65) Prior Publication Data
US 2023/0133970 A1 May 4, 2023

(51) Int. Cl.
*H04W 24/10* (2009.01)
*H04B 17/336* (2015.01)
*H04W 16/28* (2009.01)

(52) U.S. Cl.
CPC .......... *H04W 24/10* (2013.01); *H04B 17/336* (2015.01); *H04W 16/28* (2013.01)

(58) Field of Classification Search
CPC ..... H04W 24/10; H04W 16/28; H04B 17/336
See application file for complete search history.

(56) References Cited

U.S. PATENT DOCUMENTS

2009/0046569 A1    2/2009  Chen et al.
2009/0247148 A1*  10/2009  Chen ..................... H04W 72/21
                                                        455/63.1
(Continued)

FOREIGN PATENT DOCUMENTS

CN    107113648 A    8/2017
CN    110431759 A   11/2019
(Continued)

OTHER PUBLICATIONS

Supplementary Partial European Search Report—EP20935258—Search Authority—Munich—Jan. 22, 2024.
(Continued)

*Primary Examiner* — Brenda H Pham
(74) *Attorney, Agent, or Firm* — Holland & Hart / QUALCOMM Incorporated

(57) ABSTRACT

Methods, systems, and devices for wireless communications are described. In some systems, a user equipment (UE) may receive, from a base station, a control message including an indication associated with a configuration for an interference measurement (IM) report in a channel state information (CSI) report. The UE may determine a setting of the configuration for the IM report based on the indication, which may include one or both of a resource setting associated with IM information in a frequency domain or a spatial setting associated with IM information in a spatial domain. The UE may generate the IM report based on one or both of the resource setting or the spatial setting and may transmit the CSI report including the IM report to the base station.

35 Claims, 16 Drawing Sheets

(56) References Cited

U.S. PATENT DOCUMENTS

| | | | |
|---|---|---|---|
| 2010/0093287 A1 | 4/2010 | Higuchi et al. | |
| 2010/0278058 A1 | 11/2010 | Damnjanovic et al. | |
| 2014/0369262 A1 | 12/2014 | Roh et al. | |
| 2015/0312015 A1 | 10/2015 | Chen et al. | |
| 2018/0042028 A1 | 2/2018 | Nam et al. | |
| 2019/0053084 A1 | 2/2019 | Hosseini et al. | |
| 2019/0053089 A1 | 2/2019 | Kwak et al. | |
| 2019/0103928 A1 | 4/2019 | Nagaraja et al. | |
| 2019/0273544 A1* | 9/2019 | Cha | H04L 5/0091 |
| 2021/0028843 A1* | 1/2021 | Zhou | H04L 5/0053 |
| 2022/0264348 A1* | 8/2022 | Manolakos | H04B 17/345 |

FOREIGN PATENT DOCUMENTS

| | | |
|---|---|---|
| WO | WO-2018202134 A1 | 11/2018 |
| WO | WO-2019160493 A1 | 8/2019 |
| WO | WO-2019221471 A1 | 11/2019 |
| WO | WO-2020050683 A1 | 3/2020 |
| WO | WO-2020091536 A1 | 5/2020 |

OTHER PUBLICATIONS

3GPP TS 38.214: "3rd Generation Partnership Project; Technical Specification Group Radio Access Network; NR; Physical Layer Procedures for Data (Release 16)", 3GPP Draft, 38214-G10, 3GPP TS 38.214, 3rd Generation Partnership Project (3GPP), Mobile Competence Centre, 650, Route Des Lucioles, F-06921 Sophia-Antipolis Cedex, France, vol. RAN WG1. No. V16.1.0, Apr. 3, 2020 (Apr. 3, 2020), pp. 1-151, XP051893823.

International Search Report and Written Opinion—PCT/CN2020/089971—ISA/EPO—Feb. 18, 2021.

Supplementary European Search Report—EP20935258—Search Authority—Munich—Apr. 12, 2024.

* cited by examiner

DIFFERENTIAL MODE FOR INTERFERENCE-SPECIFIC CHANNEL STATE INFORMATION REPORT

CROSS REFERENCE

The present Application is a 371 national stage filing of International PCT Application No. PCT/CN2020/089971 by M A et al. entitled "DIFFERENTIAL MODE FOR INTERFERENCE-SPECIFIC CHANNEL STATE INFORMATION REPORT," filed May 13, 2020, which is assigned to the assignee hereof, and which is expressly incorporated by reference in its entirety herein.

TECHNICAL FIELD

The following relates generally to wireless communications and more specifically to one or more differential modes for interference-specific channel state information (CSI) reporting.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station and a UE may communicate over a wireless channel and, to maintain reliable communications between the base station and the UE, the UE may measure a quality of the channel and a level of interference associated with the channel. The UE may transmit the measured channel quality and the measured level of interference associated with the channel to the base station in a report. In some cases, such as for relatively low-latency applications, the UE may include the measured level of interference associated with the channel in an interference measurement report included in a channel state information report. However, conventional techniques for generating and transmitting the interference measurement report may be inefficient.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, from a base station, a control message including an indication associated with a configuration for an interference measurement (IM) report in a channel state information (CSI) report, determining a setting of the configuration for the IM report based on the indication associated with the configuration for the IM report, and transmitting, to the base station, the CSI report including the IM report based on the setting of the configuration for the IM report.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a base station, a control message including an indication associated with a configuration for an IM report in a CSI report, determine a setting of the configuration for the IM report based on the indication associated with the configuration for the IM report, and transmit, to the base station, the CSI report including the IM report based on the setting of the configuration for the IM report.

Another innovative aspect of the subject matter described in this disclosure can be implemented in another apparatus for wireless communications at a UE. The apparatus may include means for receiving, from a base station, a control message including an indication associated with a configuration for an IM report in a CSI report, determining a setting of the configuration for the IM report based on the indication associated with the configuration for the IM report, and transmitting, to the base station, the CSI report including the IM report based on the setting of the configuration for the IM report.

Another innovative aspect of the subject matter described in this disclosure can be implemented in a non-transitory computer-readable medium storing code for wireless communications at a UE. The code may include instructions executable by a processor to receive, from a base station, a control message including an indication associated with a configuration for an IM report in a CSI report, determine a setting of the configuration for the IM report based on the indication associated with the configuration for the IM report, and transmit, to the base station, the CSI report including the IM report based on the setting of the configuration for the IM report.

In some implementations of the method, apparatuses, and non-transitory computer-readable medium described herein, the setting may include a resource setting. In such implementations, the method, apparatuses, and non-transitory computer-readable medium described herein may further include operations, features, means, or instructions for determining a quantity of subbands associated with the IM report, and generating the IM report based on the quantity of subbands and the resource setting.

In some implementations of the method, apparatuses, and non-transitory computer-readable medium described herein, generating the IM report further may include operations, features, means, or instructions for determining first IM information associated with each subband of the quantity of subbands, averaging the first IM information associated with each subband of the quantity of subbands, and determining second IM information associated with each subband of the quantity of subbands based on the average of the first IM information associated with each subband of the quantity of subbands, where the IM report includes the second IM information associated with each subband of the quantity of subbands and the average of the first IM information associated with each subband of the quantity of subbands.

In some implementations of the method, apparatuses, and non-transitory computer-readable medium described herein, determining the second IM information associated with each subband of the quantity of subbands further may include operations, features, means, or instructions for determining an offset level associated with each subband of the quantity of subbands relative to the average of the first IM information associated with each subband of the quantity of subbands, and determining a differential value associated with each subband of the quantity of subbands based on the offset level and a mapping including a correspondence between one or more offset levels and one or more differential values, where the second IM information includes the differential value.

In some implementations of the method, apparatuses, and non-transitory computer-readable medium described herein, generating the IM report further may include operations, features, means, or instructions for determining first IM information associated with a first subband of the quantity of subbands, and determining second IM information associated with each remaining subband of the quantity of subbands, where the IM report includes the first IM information associated with the first subband and the second IM information associated with each remaining subband of the quantity of subbands.

In some implementations of the method, apparatuses, and non-transitory computer-readable medium described herein, determining the second IM information associated with each remaining subband of the quantity of subbands further may include operations, features, means, or instructions for determining an offset level associated with the each remaining subband of the quantity of subbands relative to the first IM information associated with the first subband, and determining a differential value associated with the each remaining subband of the quantity of subbands based on the offset level and a mapping including a correspondence between one or more offset levels and one or more differential values, where the second IM information includes the differential value.

In some implementations of the method, apparatuses, and non-transitory computer-readable medium described herein, generating the IM report further may include operations, features, means, or instructions for determining IM information associated with a frequency band including the quantity of subbands, where the IM report includes the IM information.

In some implementations of the method, apparatuses, and non-transitory computer-readable medium described herein, determining the IM information associated with the frequency band including the quantity of subbands further may include operations, features, means, or instructions for determining first IM information associated with each subband of the quantity of subbands, and averaging the first IM information associated with each subband of the quantity of subbands, where the IM information associated with the frequency band including the quantity of subbands includes the average of the first IM information associated with each subband of the quantity of subbands.

In some implementations of the method, apparatuses, and non-transitory computer-readable medium described herein, the setting further includes a spatial setting. In such implementations, the method, apparatuses, and non-transitory computer-readable medium described herein may further include operations, features, means, or instructions for generating the IM report based on the resource setting, the quantity of subbands, the spatial setting, and a quantity of antennas.

In some implementations of the method, apparatuses, and non-transitory computer-readable medium described herein, generating the IM report further may include operations, features, means, or instructions for determining one or both of first complete IM information or first differential IM information associated with each subband of the quantity of subbands based on the resource setting, and determining second differential IM information associated with each antenna of the quantity of antennas based on the spatial setting, where the IM report includes one or more of the first complete IM information, the first differential IM information, or the second differential IM information.

In some implementations of the method, apparatuses, and non-transitory computer-readable medium described herein, the setting may include a spatial setting. In such implementations, the method, apparatuses, and non-transitory computer-readable medium described herein may further include operations, features, means, or instructions for determining a quantity of antennas associated with the IM report, and generating the IM report based on the quantity of antennas and the spatial setting.

In some implementations of the method, apparatuses, and non-transitory computer-readable medium described herein, generating the IM report further may include operations, features, means, or instructions for determining first IM information associated with each antenna of the quantity of antennas, and determining second IM information associated with each antenna of the quantity of antennas based on a ratio between the first IM information associated with each antenna of the quantity of antennas and the first IM information associated with a first antenna of the quantity of antennas, where the IM report includes the first IM information associated with the first antenna and the second IM information associated with each antenna of the quantity of antennas.

Some implementations of the method, apparatuses, and non-transitory computer-readable medium described herein may further include operations, features, means, or instructions for receiving, from the base station, a downlink control message that includes triggering information associated with the setting of the configuration, activating the setting of the configuration for the IM report based on the triggering information, where the setting includes one or both of a differential resource setting or a differential spatial setting, where, and generating the IM report may be based on receiving the downlink control message and one or both of the differential resource setting or the differential spatial setting.

Some implementations of the method, apparatuses, and non-transitory computer-readable medium described herein may further include operations, features, means, or instructions for determining that a downlink channel property satisfies a threshold, and determining to change the setting to one or both of a differential resource setting or a differential spatial setting based on determining that the downlink channel property satisfies the threshold, where the CSI report includes a field indicating a request to change the setting to one or both of the differential resource setting or the differential spatial setting.

One innovative aspect of the subject matter described in this disclosure can be implemented in a method for wireless communications at a base station. The method may include determining a setting of a configuration for generating an IM report at a UE, transmitting, to the UE, a control message including an indication associated with the configuration for generating the IM report in a CSI report, and receiving, from the UE, the CSI report including the IM report based on the setting and transmitting the control message including the indication.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to determine a setting of a configuration for generating an IM report at a UE, transmit, to the UE, a control message including an indication associated with the configuration for generating the IM report in a CSI report, and receive, from the UE, the CSI report including the IM report based on the setting and transmitting the control message including the indication.

Another innovative aspect of the subject matter described in this disclosure can be implemented in another apparatus for wireless communications at a base station. The apparatus may include means for determining a setting of a configuration for generating an IM report at a UE, transmitting, to the UE, a control message including an indication associated with the configuration for generating the IM report in a CSI report, and receiving, from the UE, the CSI report including the IM report based on the setting and transmitting the control message including the indication.

Another innovative aspect of the subject matter described in this disclosure can be implemented in a non-transitory computer-readable medium storing code for wireless communications at a base station. The code may include instructions executable by a processor to determine a setting of a configuration for generating an IM report at a UE, transmit, to the UE, a control message including an indication associated with the configuration for generating the IM report in a CSI report, and receive, from the UE, the CSI report including the IM report based on the setting and transmitting the control message including the indication.

In some implementations of the method, apparatuses, and non-transitory computer-readable medium described herein, the setting may include a resource setting. In such implementations, the method, apparatuses, and non-transitory computer-readable medium described herein may further include operations, features, means, or instructions for determining a quantity of subbands associated with the IM report, and receiving the CSI report including the IM report based on the quantity of subbands and the resource setting.

Some implementations of the method, apparatuses, and non-transitory computer-readable medium described herein may further include operations, features, means, or instructions for receiving, in the IM report, second IM information associated with each subband of the quantity of subbands and an average of first IM information associated with each subband of the quantity of subbands, and determining the first IM information associated with each subband of the quantity of subbands based on the second IM information and the average of the first IM information associated with each subband of the quantity of subbands.

In some implementations of the method, apparatuses, and non-transitory computer-readable medium described herein, determining the first IM information associated with each subband of the quantity of subbands further may include operations, features, means, or instructions for determining a differential value associated with each subband of the quantity of subbands, where the second IM information includes the differential value, determining an offset level associated with each subband of the quantity of subbands relative to the average of the first IM information associated with each subband of the quantity of subbands based on the differential value and a mapping including a correspondence between one or more offset levels and one or more differential values, and determining the first IM information associated with each subband of the quantity of subbands based on the offset level and the average of the first IM information associated with each subband of the quantity of subbands.

Some implementations of the method, apparatuses, and non-transitory computer-readable medium described herein may further include operations, features, means, or instructions for receiving, in the IM report, first IM information associated with a first subband of the quantity of subbands and second IM information associated with each remaining subband of the quantity of subbands, and determining the first IM information associated with each remaining subband of the quantity of subbands based on the second IM information and the first IM information associated with the first subband.

In some implementations of the method, apparatuses, and non-transitory computer-readable medium described herein, determining the first IM information associated with each remaining subband of the quantity of subbands further may include operations, features, means, or instructions for determining a differential value associated with each remaining subband of the quantity of subbands, where the second IM information includes the differential value, determining an offset level associated with each remaining subband of the quantity of subbands relative to the first IM information associated with the first subband based on the differential value and a mapping including a correspondence between one or more offset levels and one or more differential values, and determining the first IM information associated with each remaining subband of the quantity of subbands based on the offset level and the first IM information associated with the first subband.

Some implementations of the method, apparatuses, and non-transitory computer-readable medium described herein may further include operations, features, means, or instructions for receiving, in the IM report, IM information associated with a frequency band including the quantity of subbands.

In some implementations of the method, apparatuses, and non-transitory computer-readable medium described herein, the setting further includes a spatial setting. In such implementations, the method, apparatuses, and non-transitory computer-readable medium described herein may further include operations, features, means, or instructions for receiving the IM report based on the resource setting, the quantity of subbands, the spatial setting, and a quantity of antennas.

In some implementations of the method, apparatuses, and non-transitory computer-readable medium described herein, receiving the IM report further may include operations, features, means, or instructions for receiving one or both of first complete IM information or first differential IM information associated with each subband of the quantity of subbands based on the resource setting, and receiving second differential IM information associated with each antenna of the quantity of antennas based on the spatial setting, where the IM report includes one or more of the first complete IM information, the first differential IM information, or the second differential IM information.

In some implementations of the method, apparatuses, and non-transitory computer-readable medium described herein, the setting may include a spatial setting. In such implementations, the method, apparatuses, and non-transitory computer-readable medium described herein may further include operations, features, means, or instructions for determining a quantity of antennas associated with the IM report, and receiving the CSI report including the IM report based on the quantity of antennas and the spatial setting.

In some implementations of the method, apparatuses, and non-transitory computer-readable medium described herein, receiving the IM report further may include operations, features, means, or instructions for receiving second IM information associated with each antenna of the quantity of antennas, where the second IM information includes a ratio between first IM information associated with each antenna of the quantity of antennas and the first IM information associated with a first antenna of the quantity of antennas, and receiving the first IM information associated with the first antenna.

Some implementations of the method, apparatuses, and non-transitory computer-readable medium described herein may further include operations, features, means, or instructions for transmitting, to the UE, a downlink control message that includes triggering information associated with the setting of the configuration, where the setting includes one or both of a differential resource setting or a differential spatial setting.

Some implementations of the method, apparatuses, and non-transitory computer-readable medium described herein may further include operations, features, means, or instructions for receiving, from the UE, the CSI report including a field indicating a request to change the setting to one or both of a differential resource setting or a differential spatial setting, where determining the setting of the configuration for generating the IM report may be based on receiving the CSI report including the field.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

Like reference numbers and designations in the various drawings indicate like elements.

DETAILED DESCRIPTION

Figure 1:
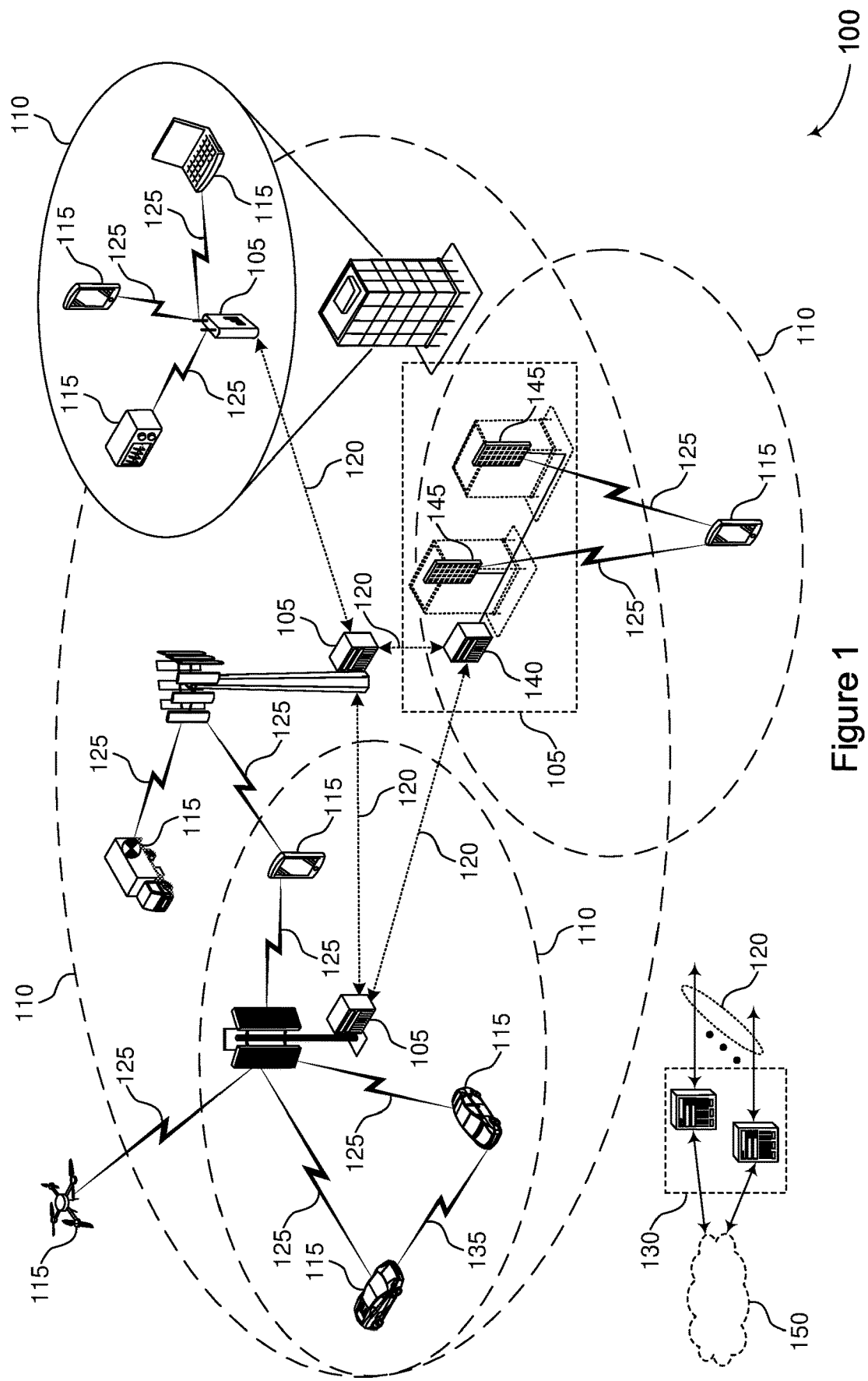
FIGS. 1 and 2 illustrate examples of a wireless communications system that supports one or more differential modes for interference-specific channel state information (CSI) reporting in accordance with aspects of the present disclosure.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G, or 5G (New Radio (NR)) standards promulgated by the 3rd Generation Partnership Project (3GPP), or the Institute of Electrical and Electronics Engineers (IEEE) 802.11 standards, the IEEE 802.15 standards, the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

Various implementations generally relate to determining a setting of a configuration for an interference measurement (IM) report and generating, at a user equipment (UE), the IM report based on the setting of the configuration. Some implementations may more specifically relate to determining that the setting includes a resource setting, or a spatial setting, or both, and generating the IM report based on the resource setting, or the spatial setting, or both. In some examples in which the setting includes the resource setting, the UE may determine IM information associated with one or more subbands (for example, each subband) of a quantity of subbands that the base station and the UE use for communications based on the resource setting. The resource setting may include a wideband IM setting, a differential subband IM setting (which may be referred to as a differential resource setting), or an absolute subband IM setting (which may alternatively be referred to herein as a complete subband IM setting in examples in which absolute and complete may be used synonymously). In some additional or alternative implementations, the setting may include the spatial setting. In such implementations, the UE may determine IM information associated with one or more antennas (for example, each antenna) of a quantity of antennas that the UE may use to receive downlink communications from the base station based on the spatial setting. In some examples, the spatial setting may include a differential spatial setting.

Particular implementations of the subject matter described in this disclosure can be implemented to realize one or more of the following potential advantages, among others. In some implementations, the described techniques can be used to reduce the overhead of an IM report while maintaining reliable IM reporting in various conditions, such as for applications requiring relatively low-latency. For example, the base station may determine the setting of the configuration for the IM report based on a channel property associated with the channel used by the base station and the UE such that the UE may better generate the IM report based on the property of the channel. For instance, the channel may be associated with a relatively low frequency variant property and, as such, the interference across each subband of the quantity of subbands of the channel may be similar. The base station may determine or configure the setting to include a differential resource setting or a differential spatial setting, or both, and the UE may generate the IM report by conveying IM information associated with at least some of the quantity of subbands, or the quantity of antennas, or both, as differential values relative to a baseline value rather than as absolute values (for example, complete values that are full values rather than differential values that may be relative to one or more absolute values or complete values). As such, the UE may avoid conveying the IM information for each subband and each antenna as an absolute value (for example, a complete value), which may reduce the amount of uplink resources the UE uses to transmit the IM report. Further, in some implementations of the described techniques, the base station may dynamically activate or deactivate the differential resource setting or the differential spatial setting, or both, which may enhance the level of flexibility and responsiveness that the base station has in adapting the configuration for the IM report based on the channel property (for example, the frequency variant property).

FIG. 1 illustrates an example of a wireless communications system 100 that supports one or more differential modes for interference-specific CSI reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a subband, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier. In some examples, the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to any combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported. In some examples, a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or any combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to determine (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more subbands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for determining a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

As described above, the base station 105 and the UE 115 may communicate over a wireless channel and, to maintain reliable communications, the UE 115 may measure a quality of the channel and an interference associated with the channel, and may transmit the measured quality and interference, as well as any other channel state information (CSI) feedback, to the base station 105, for example, in a CSI report. The base station 105 may use the measured quality and interference in the CSI report to adjust or otherwise modify one or more transmission parameters or configurations that the base station 105 or the UE 115, or both, may use to communicate. In some systems, the UE 115 may provide interference feedback (for example, the measured interference associated with the channel) to the base station 105 according to a relatively low-latency timeline. As such, the UE 115 may transmit the interference feedback in an IM report in the CSI report to meet or satisfy the relatively low-latency timeline. Using conventional techniques, however, the UE 115 may generate the IM report using an inefficient amount of uplink resources due in part to a lack of flexibility associated with a configuration for the IM report.

In contrast, in some aspects of the present disclosure, the base station 105 may determine a setting of the configuration for generating the IM report and may transmit, to the UE 115, a control message including an indication associated with the configuration. Likewise, the UE may receive the control message including the indication and determine, based on the indication, the setting of the configuration. In some aspects, the indication may include a field, such as an im-FormatIndicator field, and the configuration may include one or more higher layer parameters, such as a CSI-ReportConfig parameter. The setting may include a resource setting, or a spatial setting, or both. In some examples in which the setting is or includes a resource setting, the setting may itself include various settings, for example, a widebandIM setting, a subbandIM_absolute setting, or a subbandIM_differential setting. In other words, the indication (for example, that may be included in the im-FormatIndicator field) may be information in a field in the configuration (for example, the CSI-ReportConfig parameter) that the base station 105 may set to one of multiple settings, such as the widebandIM setting, the subbandIM_absolute setting, or the subbandIM_differential setting.

The UE 115 may generate the IM report based on the setting (which again, may itself include multiple settings) that the indication includes or indicates. In some examples, the setting may be the subbandIM_differential setting, or a differential spatial IM setting, or both, and the UE 115 may generate the IM report including differential values relative to a baseline value for at least a subset of a quantity of subbands of the channel, or at least a subset of a quantity of antennas that the UE 115 may use to receive communications from the base station 105, or both. As such, the UE 115 may transmit the IM report using fewer uplink resources than the UE 115 may otherwise use if the UE 115 generates the IM report including absolute values (for example, complete values) for each subband and each antenna.

Figure 2:
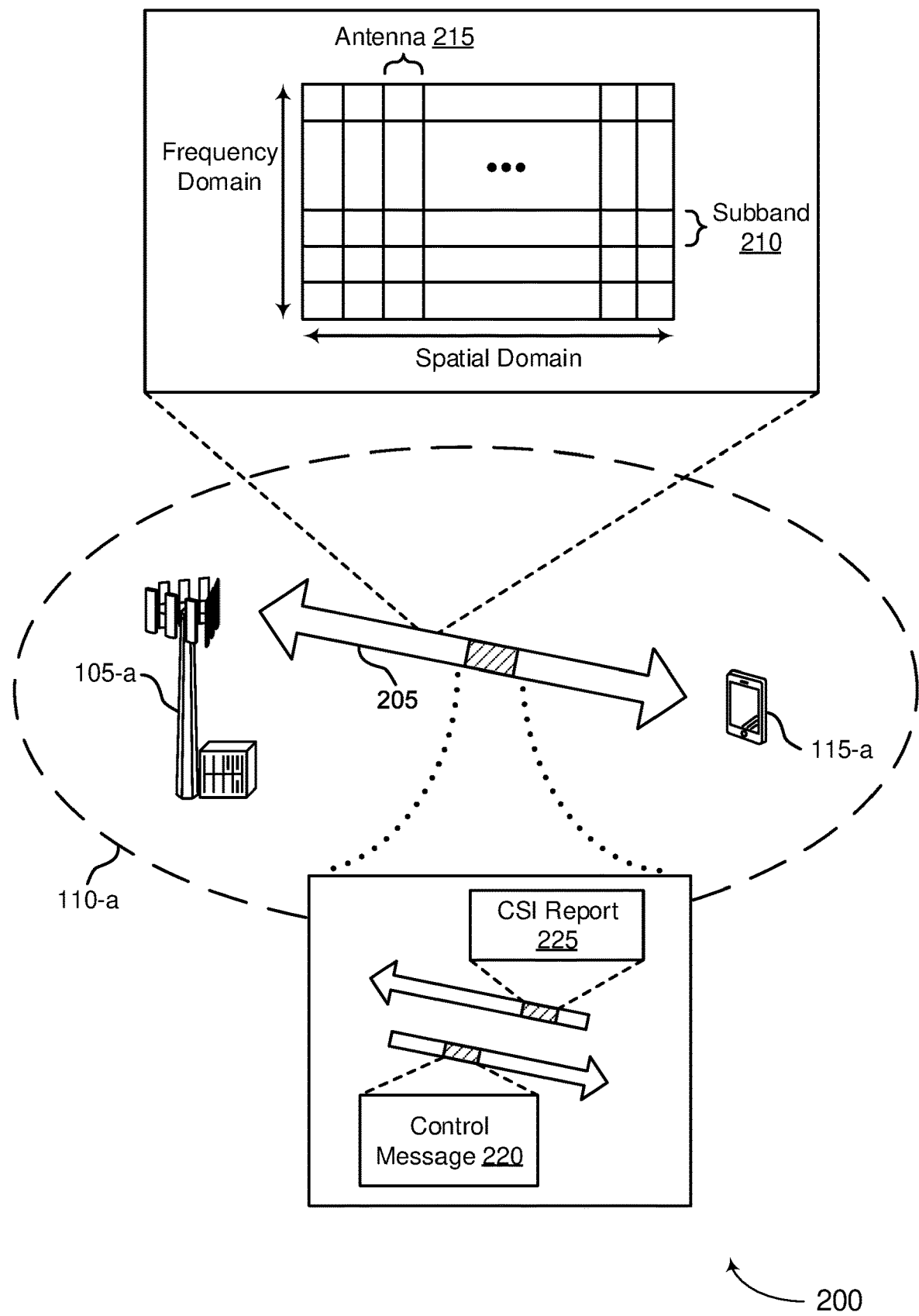

FIG. 2 illustrates an example of a wireless communications system 200 that supports one or more differential modes for interference-specific CSI reporting in accordance with aspects of the present disclosure. In some examples, the wireless communications system 200 may implement aspects of the wireless communications system 100. The wireless communications system 200 may include a base station 105-*a* and a UE 115-*a*, which may be examples of the corresponding wireless devices as described with reference to FIG. 1. The base station 105-*a* may provide network coverage for a coverage area 110-*a*. In some examples, the wireless communications system 200 may be configured to support IM reporting in a CSI report 225.

For example, a base station 105-*a* and a UE 115-*a* may support beamforming techniques and may communicate over a communications link 205 using one or more directional beams. In some examples, the quality and reliability of a directional beam used by the base station 105-*a* and the UE 115-*a* may change over time. For example, the UE 115-*a* may move (for example, change physical location) or an obstacle may move or be moved such that it is located between the base station 105-*a* and the UE 115-*a*, which may reduce the quality and reliability of the beam. To maintain a reliable beam for communications between the base station 105-*a* and the UE 115-*a*, the base station 105-*a* and the UE 115-*a* may perform a beam management procedure. In performing a beam management procedure, the base station 105-*a* may transmit one or more reference signals, such as CSI reference signals (CSI-RSs), over one or more beams and the UE 115-*a* may measure the reference signals to determine a quality associated with at least some, if not each, of the one or more beams. In some examples, such CSI-RSs may be non-zero power (NZP) CSI-RSs. In some examples, the measurement of the one or more CSI-RSs (or NZP CSI-RSs) may include or otherwise refer to a channel measurement, or an IM, or both.

The UE 115-*a* may generate a CSI report 225 including channel measurement information, or IM information, or both, based on the measurements to provide channel feedback, or interference feedback, or both, to the base station 105-*a*. In some examples, the UE 115-*a* may provide the IM feedback, which may also be referred to herein as IM information, to the base station 105-*a*, for example, implicitly via a channel quality indicator (CQI) field in the CSI report 225. For example, the UE 115-*a* may implicitly convey the IM information to the base station 105-*a* via the CQI field in the CSI report 225. In other words, the UE 115-*a* may implicitly convey the IM information to the base station 105-*a* based on what information is included in the CQI field or the format of the CQI field, or both. In some aspects, such implicit indication of the IM information via the CQI field in the CSI report 225 may be referred to as a coupling of the IM information with the CQI field. In such examples, the base station 105-*a* may indicate, via a CSI reporting setting (such as in a CSI-ReportConfig parameter), a resource setting for conveying the channel measurement information in the CSI report 225 and one or more resource settings for conveying the IM information in the CSI report 225 (for example, the implicitly reported IM information in the CSI report 225).

For instance, in some examples, the CSI resource setting may include one or more resource settings for providing channel measurement information associated with one or more NZP CSI-RSs in the CSI report 225 and may not include a resource setting for providing IM information in the CSI report 225. In some other examples, the CSI resource setting may include one or more resource settings for providing channel measurement information associated with one or more NZP CSI-RSs in the CSI report 225 and one or more resource settings for providing IM information associated with a CSI-IM (a set of resource elements reserved for IM) or one or more NZP CSI-RSs in the CSI report 225. In some other examples, the CSI resource setting may include one or more resource settings for providing channel measurement information associated with one or more NZP CSI-RSs in the CSI report 225, one or more resource settings for providing IM information associated with a CSI-IM in the CSI report 225, and one or more resource settings for providing IM information associated with one or more NZP CSI-RSs in the CSI report 225.

Such implicit IM reporting via the CQI field in the CSI report 225 may satisfy transmission timelines associated with applications that do not require relatively low-latency (for example, relaxed transmission timelines associated with some CSI reporting types). For example, for a CSI reporting type associated with subband-wise CSI feedback, in which the CSI report 225 may include channel measurement information or IM information, or both, associated with each subband 210 of a quantity of subbands 210 of a channel used by the base station 105-*a* and the UE 115-*a*, the UE 115-*a* may generate and transmit the CSI report 225 according to relaxed transmission timelines. In some examples, the latency requirement or transmission timeline associated with each CSI reporting type may be based on criteria associated with the CSI reporting type and may be pre-configured at the UE 115-*a* or defined by a specification.

In some systems associated with variable or bursty traffic patterns, such as some edge computing systems (for example, 5G extended reality (XR) systems), however, the base station 105-*a* may attempt to handle downlink transmissions (for example, adjust or modify one or more transmission parameters) more aggressively and, as such, the UE 115-*a* may transmit IM information to the base station 105-*a* according to stricter transmission timelines (transmission timelines associated with applications that require relatively low-latency). In such systems, the UE 115-*a* may transmit the IM information in an IM report-only CSI report 225 to satisfy the relatively low-latency requirements or meet the stricter transmission timelines. In other words, the UE 115-*a* may transmit a CSI report 225 to the base station 105-*a* including only IM information or including IM information and a reduced amount of channel feedback relative to a full CSI report 225. Such IM report-only CSI reports 225 may be associated with reduced computation complexity relative to the full CSI report 225 and may achieve relatively lower latency CSI feedback than full CSI reports 225. In some examples, such an IM report-only CSI report 225 may be referred to as an interference-specific CSI report 225.

A CSI reporting setting for an IM report-only CSI report 225 may include one or more resource settings for providing IM information in the IM report-only CSI report 225. For instance, in some examples, the CSI reporting setting may include one or more resource settings for providing IM information associated with a CSI-IM or one or more NZP CSI-RSs in the CSI report 225. In some other cases, the CSI resource setting may include one or more resource settings for providing IM information associated with a CSI-IM in the CSI report 225 and one or more resource settings for providing IM information associated with one or more NZP CSI-RSs in the CSI report 225.

In some examples, the IM report included in the IM report-only CSI report 225 may include IM information associated with each subband 210 of the quantity of subbands 210 of the channel used by the base station 105-*a* and the UE 115-*a*. For example, the base station 105-*a* and the UE 115-*a* may communicate using a channel including a quantity of subbands 210 and the UE 115-*a* may include IM information associated with each subband 210 in the IM report. In other words, the IM report may feature subband-level granularity. In some examples, for each subband, the UE 115-*a* may also include IM information associated with each antenna 215 that the UE 115-*a* may use to receive downlink communications from the base station 105-*a* (for example, each reception (Rx) antenna 215 of the UE 115-*a*). In some examples, the IM information for each subband 210 may be constructed as a diagonal matrix structure in which each diagonal entry of the matrix corresponds to IM information (IM feedback) associated with a respective antenna 215. As such, the diagonal matrix may be a square matrix with a size based on (such as, equal to) the number of antennas 215 at the UE 115-*a*. For example, a diagonal matrix $R_{nn}$ for a subband 210 may be defined according to Equation (1) below. $R_{nn}$ may be defined as a matrix of size n×n where n=2, 4, 6, 8, among other examples, based on the number of antennas 215 at the UE 115-*a*, where each diagonal entry $r_{11}, \ldots, r_{nn}$ corresponds to IM information associated with an antenna 215.

$$R_{nn} = \begin{bmatrix} r_{11} & \cdots & 0 \\ \vdots & \ddots & \vdots \\ 0 & \cdots & r_{nn} \end{bmatrix} \quad (1)$$

The UE 115-*a* may use Equation (1) to determine the IM information for each subband and may generate the IM report including the IM information for each subband. In some examples, however, an IM report including absolute IM information for each of the quantity of subbands 210 across the quantity of antennas 215 may inefficiently use uplink resources. For example, the UE 115-*a* may generate the IM report including absolute IM information for each of the quantity of subbands 210 across the quantity of antennas 215 using a relatively large number of bits and may use a relatively large amount of uplink resources to transmit the CSI report 225 including the IM report. Further, in some examples, the channel used by the base station 105-*a* and the UE 115-*a* for communications may be associated with a relatively low frequency variant property such that the difference in IM information associated with each subband 210 may be relatively small. In other words, the interference gap across the different subbands 210 may be small. As such, generating the IM report including absolute IM information may result in unnecessary overhead because the UE 115-*a* may more efficiently generate the IM report including differential IM information associated with each subband 210 or each antenna, 215, or both, relative to a baseline, which may use a smaller number of bits and fewer uplink resources than absolute IM information when the channel is associated with the relatively low frequency variant property.

In some implementations of the present disclosure, the base station 105-*a* and the UE 115-*a* may support a setting of a configuration for generating the IM report and the UE 115-*a* may transmit the CSI report 225 including the IM report more efficiently based on the setting. For example, the setting may account for the frequency variance of the channel and the UE 115-*a* may, based on the setting, transmit the CSI report 225 including the IM report using an appropriate amount of uplink resources based on the frequency variance of the channel.

In some examples, the base station 105-*a* may transmit a control message 220 including an indication (an indication including a setting, such as a resource setting or a spatial setting, or both) associated with the configuration to the UE 115-*a*. In some aspects, the control message 220 may include or otherwise refer to control signaling, such as RRC signaling, among other examples. In some examples, the indication may be information included an im-FormatIndicator field and may be associated with a CSI-ReportConfig parameter (for example, the configuration) for the IM report. For example, the base station 105-*a* may configure a CSI report 225 based on configuring the parameters of the CSI-ReportConfig parameter, the configured parameters including one or more of a reportConfigType, a reportQuantity, a reportFreqConfiguration, a timeRestrictionForChannelMeasurement, a timeRestrictionForInterferenceMeasurement, or a codebookConfig. In some implementations of the present disclosure, the base station 105-*a* may include the indication (for examples, related to the im-FormatIndicator field) in the reportFreqConfiguration parameter of the CSI-ReportConfig parameter. For example, the base station 105-*a* may include the information in the im-FormatIndicator field along with the cqi-FormatIndicator field and the pmi-FormatIndicator field in the reportFreqConfiguration parameter.

In some examples, the UE 115-*a* may determine the setting of the configuration based on a setting of the indication. For example, the UE 115-*a* may determine the setting of the configuration based on determining which setting the im-FormatIndicator field is set to for the UE. In some aspects, the indication may be set to one of a wideband IM setting, an absolute subband IM setting (for example, a complete subband IM setting), or a differential subband IM setting. In some specific implementations, such a wideband IM setting, an absolute subband IM setting (for example, a complete subband IM setting), or a differential subband IM setting may be referred to as a widebandIM setting, a subbandIM_absolute setting, or a subbandIM_differential setting, respectively. As such, the reportFreqConfiguration parameter may include the cqi-FormatIndicator field, which may return a widebandCQI setting or a subbandCQI setting, the pmi-FormatIndicator field, which may return a widebandPMI setting or a subbandPMI setting, and the im-FormatIndicator field, which may return a widebandIM setting, a subbandIM_absolute setting, or a subbandIM_differential setting. In some examples, the reportFreqConfiguration parameter may additionally include one or more other parameters or other information.

In some examples in which the indication is set to the wideband IM setting, the UE 115-*a* may generate the IM report using wideband IM information. In other words, the UE 115-*a* may generate the IM report using a wideband-level of granularity. For example, the UE 115-*a* may measure the interference associated with a frequency band (the wideband) including the quantity of subbands 210 and may include the IM information associated with the frequency band in the IM report. In some specific implementations, the UE 115-*a* may determine the IM information associated with the frequency band based on measuring the interference associated with each subband 210 of the quantity of subbands 210 and averaging the measured interference across the quantity of subbands 210. The UE 115-*a* may transmit the IM report including the IM information associated with the frequency band coupled with a CQI field in the CSI report 225. For example, the UE 115-*a* may apply the wideband IM report to the CQI field in the CSI report 225 to implicitly convey the IM information associated with the frequency band to the base station 105-*a* via the CQI field. In other words, the UE 115-*a* may couple the wideband IM report with the CQI field based on the information that the UE 115-*a* includes in the CQI field or the format of the CQI field, or both. As such, the base station 105-*a* may determine the IM information associated with the frequency band based on the information included in the CQI field or the format of the CQI field, or both. In some implementations, the base station 105-*a* may determine to use the wideband IM setting to reduce the amount of uplink resources used by the CSI report 225 including the IM report or to reduce the computation complexity at the UE 115-*a* (by reducing the level of granularity that the UE 115-*a* may generate the IM report with).

In some examples in which the indication is set to the absolute subband IM setting, the UE 115-*a* may generate the IM report using absolute subband IM information (for example, full or complete IM information). In other words, the UE 115-*a* may generate the IM report using the absolute IM information at a subband-level of granularity. For example, the UE 115-*a* may measure the interference associated with each subband 210 of the quantity of subbands 210 and may include the absolute IM information (for example, absolute interference feedback) associated with each subband 210 in the IM report. Additional details relating to generating the IM report based on the absolute subband IM setting are described herein, for example, with reference to FIG. 3.

In some examples in which the indication is set to the differential subband IM setting, the UE 115-*a* may generate the IM report using differential subband IM information (for example, IM information that is relative to, such as an offset from, full or complete IM information). In other words, the UE 115-*a* may generate the IM report using differential IM information for at least a subset of the subbands 210 at a subband-level of granularity. For example, the UE 115-*a* may measure the interference associated with each subband 210 of the quantity of subbands 210 and may determine some baseline IM information (for example, baseline absolute IM information) based on the measured interference associated with one or more of the quantity of subbands 210. For example, the UE 115-*a* may determine the baseline IM information based on an average of the determined IM information associated with each subband 210 of the quantity of subbands 210 or based on absolute IM information associated with a first subband 210, among other examples. In such examples, the UE 115-*a* may generate the IM report including differential values associated with at least a subset of the subbands 210 relative to the baseline IM information. Additional details relating to generating the IM report based on the differential subband IM setting are described herein, for example, with reference to FIG. 3.

The wideband IM setting, the absolute subband IM setting (for example, the complete subband IM setting), and the differential subband IM setting may be examples of a resource setting of the configuration for the IM report. In some additional or alternative implementations, the setting may include a spatial setting. In such implementations, the spatial setting may be provided in the im-FormatIndicator field in the reportFreqConfiguration parameter or in a different field or parameter of the configuration for the IM report (for example, the CSI-ReportConfig parameter). In examples in which the spatial setting is provided in a different field or parameter (for example, a different higher layer configuration), the indication may refer to any field or parameter that may include such a spatial setting or the resource setting, or both, or may refer to multiple fields or parameters (such as if a first field or parameter includes the resource setting and a second field or parameter includes the spatial setting).

The spatial setting may include an absolute spatial IM setting or a differential spatial IM setting (for example, an absolute IM reporting setting or a differential IM reporting setting in the spatial domain) such that the base station 105-a may control how the UE 115-a transmits IM information associated with each antenna 215 of the quantity of antennas 215 in the IM report. In some examples, the base station 105-a may determine to configure the spatial setting to the absolute spatial IM reporting setting and the UE 115-a may generate the IM report including absolute IM information associated with each antenna 215 of the quantity of antennas 215. In some other examples, the base station 105-a may determine to configure the spatial setting to the differential spatial IM reporting setting and the UE 115-a may generate the IM report including differential IM information associated with at least a subset of the quantity of antennas 215. In such examples, the differential IM information may use fewer bits than the absolute IM information and, as such, the UE 115-a may reduce the overhead associated with the CSI report 225 including the IM report.

In some examples in which the spatial setting is the differential IM reporting setting, the UE 115-a may report differential IM information associated with each antenna 215 of the quantity of antennas 215 relative to a reference or baseline antenna 215. In some aspects, the UE 115-a may determine the baseline antenna 215 based on determining which antenna 215 is associated with the lowest interference. The absolute IM information (the interference level) associated with the baseline antenna 215 may be referred to as IM_level_Rx1. In some implementations, the UE 115-a may determine differential IM information associated with each antenna 215 relative to the absolute IM information associated with the baseline antenna 215 based on determining a ratio between the absolute IM information associated with each antenna 215 and the absolute IM information associated with the baseline antenna 215. In other words, the UE 115-a may determine the absolute IM information associated with each antenna 215, determine which antenna 215 is the baseline antenna 215, and determine a ratio between the absolute IM information associated with each antenna 215 and the absolute IM information associated with the baseline antenna 215. In some aspects, the ratio (the differential IM information) associated with each antenna 215 may be referred to as delta_IM_level. The ratio associated with an $i^{th}$ antenna 215 may be defined mathematically as $r_{ii}/r_{11}$, where $r_{ii}$ corresponds to an entry in the $R_{nn}$ matrix corresponding to the absolute IM information associated with the $i^{th}$ antenna 215 and $r_{11}$ corresponds to the absolute IM information associated with the baseline antenna 215 (in this example, the antenna 215 corresponding to the first entry in the $R_{nn}$ matrix).

In some implementations, the UE 115-a may convey the ratio in the IM report based on a quantity of bits (for example, a single fixed quantity of bits) and a range of IM ratios. For example, the UE 115-a may determine a range of IM ratios and may determine a level of granularity of the range of IM ratios (for example, a number of values in the range of IM ratios) based on the quantity of bits. The UE 115-a may convey the ratio in the IM report based on the level of granularity of the range. For instance, the range of IM ratios may include the range, in decibels (dBs), between −5 dB and −20 dB and the UE 115-a may use Y bits to convey the ratio associated with each antenna 215. As such, the UE 115-a may determine $2^Y$ values between −5 dB and −20 dB and may map the determined ratio (the differential IM information) associated with each antenna 215 to one of the $2^Y$ values between −5 dB and −20 dB. In other words, the UE 115-a may perform uniform quantization across the number of antennas 215 at the UE 115-a based on determining a ratio associated with each antenna 215 based on a single quantity of Y bits.

In some examples, the UE 115-a may map the determined ratio to the closest of the $2^Y$ values or may use some other function, algorithm, or procedure to map the determined ratio to one of the $2^Y$ values. The IM report may include the absolute IM information associated with the baseline antenna 215 (the IM_level_Rx1) and differential IM information (the ratios or the delta_IM_level) for each remaining antenna 215 of the quantity of antennas 215. As such, the differential IM information may use $Y*(N\_Rx-1)$ bits to indicate the differential IM information, where N_Rx corresponds to the quantity of antennas 215 (Rx antennas) at the UE 115-a. In some aspects, the UE 115-a may receive an indication of the Y bits from the base station 105-a via RRC signaling.

In some other implementations, the UE 115-a may convey the ratio in the IM report based on multiple quantities of bits and the range of IM ratios. For example, the base station 105-a may signal a different quantity of bits for each antenna 215 and the UE 115-a may use a different quantity of bits to report the differential IM information (for example, the ratios) associated with each antenna 215. In other words, the UE 115-a may perform non-uniform quantization across the number of antennas 215 at the UE 115-a based on using a different number of bits to determine the ratios associated with each antenna 215. For instance, the base station 105-a may configure $Y\_i$ bits for the $i^{th}$ antenna 215 and the UE 115-a may use $2^{Y\_i}$ values of the range of IM ratios (for example, $2^{Y\_i}$ values between −5 dB and −20 dB) to report the ratio In some aspects, the UE 115-a may receive an indication (or multiple indications) of the multiple quantities of bits from the base station 105-a via RRC signaling.

As such, the UE 115-a may include the absolute IM information associated with the baseline antenna 215 and the differential IM information associated with each remaining antenna 215 (for example, based on uniform or non-uniform quantization using one or more quantities of configured bits) in the IM report based on the differential spatial IM setting. In some examples, the setting of the configuration for the IM report may include both of a differential subband IM setting and a differential spatial IM setting and the UE 115-a may generate the IM report including differential IM information for at least a subset of the quantity of subbands 210 as well as differential IM information for at least a subset of the quantity of antennas 215, which may further reduce the overhead associated with the IM report relative to using the differential subband IM setting or the differential spatial IM setting alone.

In some examples, the base station 105-a may trigger or otherwise activate the setting of the configuration (which may be a setting of the UE) to the differential IM setting (a differential resource setting or a differential spatial setting, or both) for differential IM reporting based on transmitting the control message 220 (for example, based on the higher layer configuration). In some other examples, the base station 105-*a* may dynamically trigger or activate the setting of the configuration to the differential IM setting via triggering information in a downlink control message, such as via downlink control information (DCI).

For example, the base station 105-*a* may determine to use the differential subband IM setting of the configuration for the IM report based on determining that the channel used by the base station 105-*a* and the UE 115-*a* has a relatively low frequency variant property or a relatively flat fading property and that the IM information associated with each subband 210 may vary less than a threshold amount. For example, the base station 105-*a* may determine that a range of the IM information associated with each subband 210 is less than a threshold range or that the difference between the IM information associated with two subbands 210 is less than a threshold difference and may determine that the differential subband IM setting may result in a more efficient use of uplink resources (reduce the size of the IM report) or reduce the computational complexity at the UE 115-*a* relative to the computational complexity associated with generating an IM report including absolute IM information.

Additionally or alternatively, the base station 105-*a* may determine to use a differential spatial IM setting of the UE based on determining that the interference levels across the number of antennas 215 reported by the UE 115-*a* (in a previous IM report, for example) are relatively stable. For example, the base station 105-*a* may determine that the IM information associated with each antenna 215 varies less than a threshold amount and may trigger or activate the differential spatial setting based on determining that the IM information associated with each antenna 215 varies less than the threshold amount. For example, the base station 105-*a* may determine that a range of the IM information associated with each antenna 215 is less than a threshold range or that the difference between the IM information associated with two antennas 215 is less than a threshold difference and may determine that the differential spatial setting may result in a more efficient use of uplink resources (reduce the size of the IM report) or reduce the computational complexity at the UE 115-*a* relative to the computational complexity associated with generating an IM report including absolute IM information.

In some specific implementations, the base station 105-*a* may determine to use the differential IM setting (in either the frequency domain or the spatial domain, or both) based on receiving an indication from the UE 115-*a*. For example, the UE 115-*a* may determine that the IM information associated with each subband 210 or each antenna 215, or both, varies less than the threshold amount and may transmit an indication in a field, such as a Trig_diff field, in a CSI report 225 (a previous CSI report 225) to request the base station 105-*a* to configure the setting to the differential IM setting. In some examples, the UE 115-*a* may determine that the IM information associated with each subband 210 or each antenna 215, or both, varies less than the threshold amount based on, for example, referencing a previous IM report, or based on referencing current IM information associated with each subband 210 of the quantity of subbands 210, or each antenna 215 of the quantity of antennas 215, or both.

In some examples, the base station 105-*a* may deactivate the setting from the differential IM setting (in the frequency domain or the spatial domain, or both) to an absolute IM setting for absolute IM reporting based on transmitting the control message 220 (for example, based on the higher layer configuration). In some other examples, the base station 105-*a* may dynamically deactivate the setting to the absolute IM setting (in either the frequency domain or the spatial domain, or both) via a downlink control message, such as via DCI.

For example, the base station 105-*a* may determine to use the absolute subband IM setting (for example, a complete subband IM setting) of the configuration for the IM report based on determining that the channel used by the base station 105-*a* and the UE 115-*a* has a high frequency variant property or a relatively steep fading property and that the IM information associated with each subband 210 may vary greater than a threshold amount. For example, the base station 105-*a* may determine that a range of the IM information associated with each subband 210 is greater than a threshold range or that the difference between the IM information associated with two subbands 210 is greater than a threshold difference and may determine that the absolute subband IM setting may result in a more efficient use of uplink resources (reduce the size of the IM report) or reduce the computational complexity at the UE 115-*a* relative to the computational complexity associated with generating an IM report including differential IM information.

Additionally or alternatively, the base station 105-*a* may determine to use the absolute spatial IM setting based on determining that the interference levels (the IM information) across the number of antennas 215 reported by the UE 115-*a* (reported in a previous IM report, for example) are relatively unstable or variable. For example, the base station 105-*a* may determine that the IM information associated with each antenna 215 varies greater than a threshold amount and may deactivate the differential spatial IM setting (and activate the absolute spatial IM setting) based on determining that the IM information associated with each antenna 215 varies greater than the threshold amount. For example, the base station 105-*a* may determine that a range of the IM information associated with each antenna 215 is greater than a threshold range or that the difference between the IM information associated with two antennas 215 is greater than a threshold difference and may determine that the absolute spatial IM setting may result in a more efficient use of uplink resources (reduce the size of the IM report) or reduce the computational complexity at the UE 115-*a* relative to the computational complexity associated with generating an IM report including differential IM information.

In some specific implementations, the base station 105-*a* may determine to use the absolute IM setting (in either the frequency domain or the spatial domain, or both) based on receiving an indication from the UE 115-*a*. For example, the UE 115-*a* may determine that the IM information associated with each subband 210 or each antenna 215, or both, varies greater than the threshold amount and may transmit an indication in a field, such as a Trig_diff field, in a CSI report 225 (a previous CSI report 225) to request the base station 105-*a* to configure the setting to the absolute IM setting. In some examples, the UE 115-*a* may determine that the IM information associated with each subband 210 or each antenna 215, or both, varies greater than the threshold amount based on referencing a previous IM report or based on referencing current IM information associated with each subband 210 of the quantity of subbands 210 or each antenna 215 of the quantity of antennas 215, or both.

As such, the UE 115-*a* may determine the setting of the configuration for the IM report and generate the IM report based on the setting, which may provide more flexibility to account for the variance in interference levels across the quantity of subbands 210 or the quantity of antennas 215, or both. Accordingly, the UE 115-a may generate the IM report using a more optimal amount of uplink resources, which may reduce system overhead and increase the spectral efficiency of the system. Moreover, the base station 105-a may dynamically activate or deactivate the differential IM setting via the downlink control message, which may further increase the flexibility and control that the base station 105-a has in determining the configuration for generating the IM report at the UE 115-a.

Figure 3:
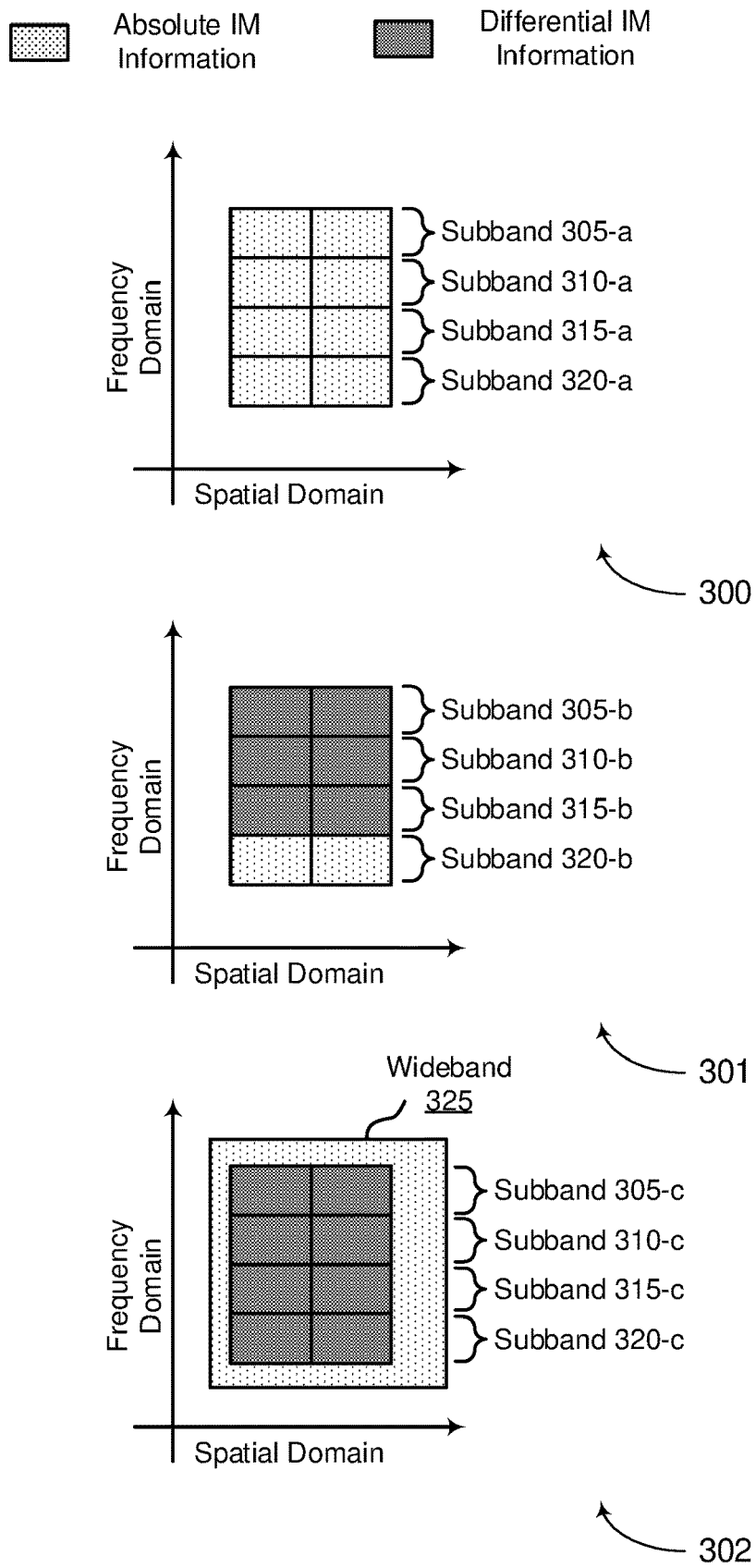
FIG. 3 illustrates example interference measurement (IM) reporting configurations that support one or more differential modes for interference-specific CSI reporting in accordance with aspects of the present disclosure.

FIG. 3 illustrates example IM reporting configurations 300, 301, and 302 that support one or more differential modes for interference-specific CSI reporting in accordance with aspects of the present disclosure. In some examples, the IM reporting configurations 300, 301, and 302 may be implemented by one or more aspects of a wireless communications system 100 or a wireless communications system 200. The IM reporting configurations 300, 301, and 302 illustrate examples of the present disclosure in which the setting includes a resource setting. For example, the IM reporting configuration 300 may be a visualization of an IM report associated with a configuration including an absolute subband IM setting (for example, a complete subband IM setting), and the IM reporting configuration 301 and the IM reporting configuration 302 may be visualizations of alternatives for an IM report associated with a configuration including a differential subband IM setting.

As described with reference to FIG. 2, the setting may include a resource setting and a UE 115 may generate an IM report for a base station 105 based on the resource setting and a quantity of subbands of a channel used by the base station 105 and the UE 115. The IM report may include IM information (either absolute or differential) associated with each subband of the quantity of subbands in the frequency domain across a quantity of antennas (Rx antennas) at the UE 115 in the spatial domain. Although IM reporting configurations 300, 301, and 302 may illustrate four subbands (including a subband 305, a subband 310, a subband 315, and a subband 320) and two antennas as various examples, any quantity of subbands and any quantity of antennas may be applicable without exceeding the scope of the present disclosure.

In IM reporting configuration 300, the base station 105 may set the indication (for example, information in the im-FormatIndicator field) to an absolute subband IM setting, such as a subbandIM_absolute setting, and the UE 115 may generate the IM report accordingly. In some examples, the UE 115-a may determine the absolute IM information associated with each of a subband 305-a, a subband 310-a, a subband 315-a, and a subband 320-a and determine a bit line (a number of bits) corresponding to the absolute IM information associated with each antenna of each subband to include in the IM report. In some aspects, the quantity of bits of a bit line corresponding to absolute IM information may be referred to as N1 bits and, as such, the IM report may include a quantity of bits equal to N_sub*N_Rx*N1, where N_sub corresponds to the quantity of subbands of the channel used by the base station 105 and the UE 115 and N_Rx corresponds to the quantity of antennas at the UE 115. As described above, the base station 105-a may set the indication to the absolute subband IM setting in examples in which the channel used by the base station 105 and the UE 115 is associated with a high frequency variant property or a steep fading property.

In IM reporting configuration 301, the base station 105 may set the indication (for example, information in the im-FormatIndicator field) to a differential subband IM setting, such as a subbandIM_differential setting, and the UE 115 may generate the IM report accordingly. In some examples, the UE 115-a may determine the absolute IM information associated with each of a subband 305-b, a subband 310-b, a subband 315-b, and a subband 320-b and determine a bit line (for example, a number of bits) corresponding to the absolute IM information associated with each antenna of each subband. In some implementations, the UE 115 may determine to select or reference a subband, such as subband 320-b, as a baseline subband from which to determine differential IM information. The UE 115 may determine to reference the subband 320-b based on a configuration, signaling from the base station 105, an interference level, or any other procedure, or selection rule, or algorithm that may be used for selecting a subband from a set of subbands. In such implementations, the UE 115 may determine an offset level associated with each remaining subband, such as the subband 305-b, the subband 310-b, and the subband 315-b relative to the absolute IM information associated with the subband 320-b. Based on determining the offset level, the UE 115 may determine a differential value (for example, differential IM information) based on the offset level and may determine a mapping between a set of differential values and a set of offset levels.

In some examples, the mapping may be defined at the UE 115, for example, in or via higher layer configurations, such as those signaled to the UE 115 from the base station 105 via RRC signaling. Additionally or alternatively, the base station 105 may transmit an indication of the mapping (or an indication of an adjustment or an update for the mapping) to the UE 115 in a downlink control message, such as DCI. Additionally or alternatively, the mapping may be pre-configured at the UE 115 (based on a definition in a product or industry standard specification). An example mapping is shown in Table 1 below.

TABLE 1

| Mapping Between Offset Level and Differential Value | |
| --- | --- |
| Differential Value | Offset Level |
| 0 | [0, 1] dB |
| 1 | [−1, 0] dB |
| 2 | >1 dB |
| 3 | <−1 dB |

For example, the UE 115 may determine that an offset level associated with the subband 305-b relative to the subband 320-b is between 0 dB and 1 dB for a first antenna and, based on the mapping, may determine that a differential value associated with the subband 305-b is 0 for the first antenna. As such, the UE 115 may use a quantity of bits (such as 2 bits) to convey the differential value of 0 in the IM report. For example, the UE 115 may use a bit line of 00 to convey the differential IM information for the subband 305-b for the first antenna. As a further example, the UE 115 may determine that a second offset level associated with the subband 305-b relative to the subband 320-b is greater than 1 dB for a second antenna and, based on the mapping, may determine that a second differential value associated with the subband 305-b is 2 for the second antenna. As such, the UE 115 may use a bit line of 10 to convey the differential IM information for the subband 305-b for the second antenna. The UE 115 may perform a similar process for each remaining subband across the quantity of antennas at the UE 115 to generate the differential IM information associated with the subband 305-b, the subband 310-b, and the subband 315-b.

Accordingly, the UE 115 may transmit the IM report in the CSI report including the differential IM information associated with the subband 305-*b*, the subband 310-*b*, and the subband 315-*b* and absolute IM information associated with the subband 320-*b*.

In some examples, the UE 115 may use a configured quantity of bits to convey the IM information associated with each of the quantity of subbands. For example, the UE 115 may use N1 bits to convey the absolute IM information associated with the subband 320-*b* for each antenna and may use N2 bits to convey the differential IM information associated with the subband 305-*b*, the subband 310-*b*, and the subband 315-*b* across each antenna. As such, the IM report may include a number of bits equal to N_Rx*N1+(N_sub−1)*N_Rx*N2, where N_sub corresponds to the quantity of subbands of the channel used by the base station 105 and the UE 115 and N_Rx corresponds to the quantity of antennas at the UE 115. In some aspects, N1 may be equal to any quantity of bits, but may sometimes be equal to 4, 5, 6, 7, or 8 bits and N2 may also be equal to any quantity of bits, but may sometimes be equal to 2, 3, or 4 bits. In some examples, the base station 105 may transmit an indication of the quantity of bits N1 and N2 to the UE 115 via RRC signaling or in other higher layer configurations. Alternatively, the quantity of bits N1 and N2 may be pre-configured at the UE 115.

In some implementations, the bit line associated with each subband in the IM report may correspond to a subband-specific $R_{nn}$ matrix including IM information associated with each antenna of a subband. For example, the bit line for an $i^{th}$ subband may correspond to an $R_{nn(SBi)}$ matrix, as defined according to Equation (2) below, where each diagonal entry $r_{11\_i}, \ldots, r_{nn\_i}$ may correspond to IM information associated with one of the antennas of the quantity of antennas at the UE 115.

$$R_{nn(SBi)} = \begin{bmatrix} r_{11\_i} & \cdots & 0 \\ \vdots & \ddots & \vdots \\ 0 & \cdots & r_{nn\_i} \end{bmatrix} \quad (2)$$

In IM reporting configuration 302, the base station 105 may set the indication (for example, information in the im-FormatIndicator field) to a differential subband IM setting, such as a subbandIM_differential setting, and the UE 115 may generate the IM report accordingly. In some examples, the UE 115-*a* may determine the absolute IM information associated with each of a subband 305-*c*, a subband 310-*c*, a subband 315-*c*, and a subband 320-*c* and determine a bit line (a number of bits) corresponding to the absolute IM information associated with each antenna of each subband.

In some implementations, the UE 115 may determine to select or reference a frequency band, such as wideband 325, as a baseline frequency band from which to determine the differential IM information. In such implementations, the UE 115 may average the absolute IM information associated with each of the subband 305-*c*, the subband 310-*c*, the subband 315-*c*, and the subband 320-*c* to determine baseline IM information associated with the wideband 325.

Upon determining the baseline IM information associated with the wideband 325, the UE 115 may determine an offset level associated with each subband relative to the baseline IM information associated with the wideband 325. Based on determining the offset level associated with each subband, the UE 115 may determine a differential value (differential IM information) associated with each subband based on the offset level and a mapping between a set of differential values and a set of offset levels, such as the example mapping shown in Table 1.

For example, the UE 115 may determine that an offset level associated with the subband 305-*c* relative to the wideband 325 is between 0 dB and 1 dB for a first antenna and, based on the mapping, may determine that a differential value associated with the subband 305-*c* is 0 for the first antenna. As such, the UE 115 may use a quantity of bits (such as 2 bits) to convey the differential value of 0 in the IM report. For example, the UE 115 may use a bit line of 00 to convey the differential IM information for the subband 305-*c* for the first antenna. As another example, the UE 115 may determine that a second offset level associated with the subband 305-*c* relative to the wideband 325 is greater than 1 dB for a second antenna and, based on the mapping, may determine that a second differential value associated with the subband 305-*c* is 2 for the second antenna. As such, the UE 115 may use a bit line of 10 to convey the differential IM information for the subband 305-*c* for the second antenna. The UE 115 may perform a similar process for each remaining subband across the quantity of antennas at the UE 115 to generate the differential IM information associated with the subband 305-*c*, the subband 310-*c*, the subband 315-*c*, and the subband 320-*c*. Accordingly, the UE 115 may transmit the IM report in the CSI report including the differential IM information associated with the subband 305-*c*, the subband 310-*c*, the subband 315-*c*, and the subband 320-*c* and including the absolute IM information associated with the wideband 325 (the baseline IM information).

In such examples in which the absolute IM information associated with the wideband 325 is referenced as the baseline for differential IM reporting, the bit line associated with each subband in the IM report may correspond to a subband-specific $R_{nn}$ matrix including IM information associated with each antenna of a subband. Further, the UE 115 may include, in the IM report, a bit line associated with the absolute IM information associated with the wideband 325. As such, the base station 105 may determine, for example, by performing an inverse operation relative to the UE 115, the absolute IM information associated with each subband based on the absolute IM information associated with the wideband 325 and the mapping between the set of differential values and the set of offset values. In some aspects, the bit line associated with the absolute IM information associated with the wideband 325 may correspond to a wideband-specific $R_{nn}$ matrix, as defined according to Equation (3) below, where each diagonal entry $r_{11}, \ldots, r_{nn}$ may correspond to IM information associated with one of the antennas of the quantity of antennas at the UE 115.

$$R_{nn(WB)} = \begin{bmatrix} r_{11} & \cdots & 0 \\ \vdots & \ddots & \vdots \\ 0 & \cdots & r_{nn} \end{bmatrix} \quad (3)$$

Figure 4:
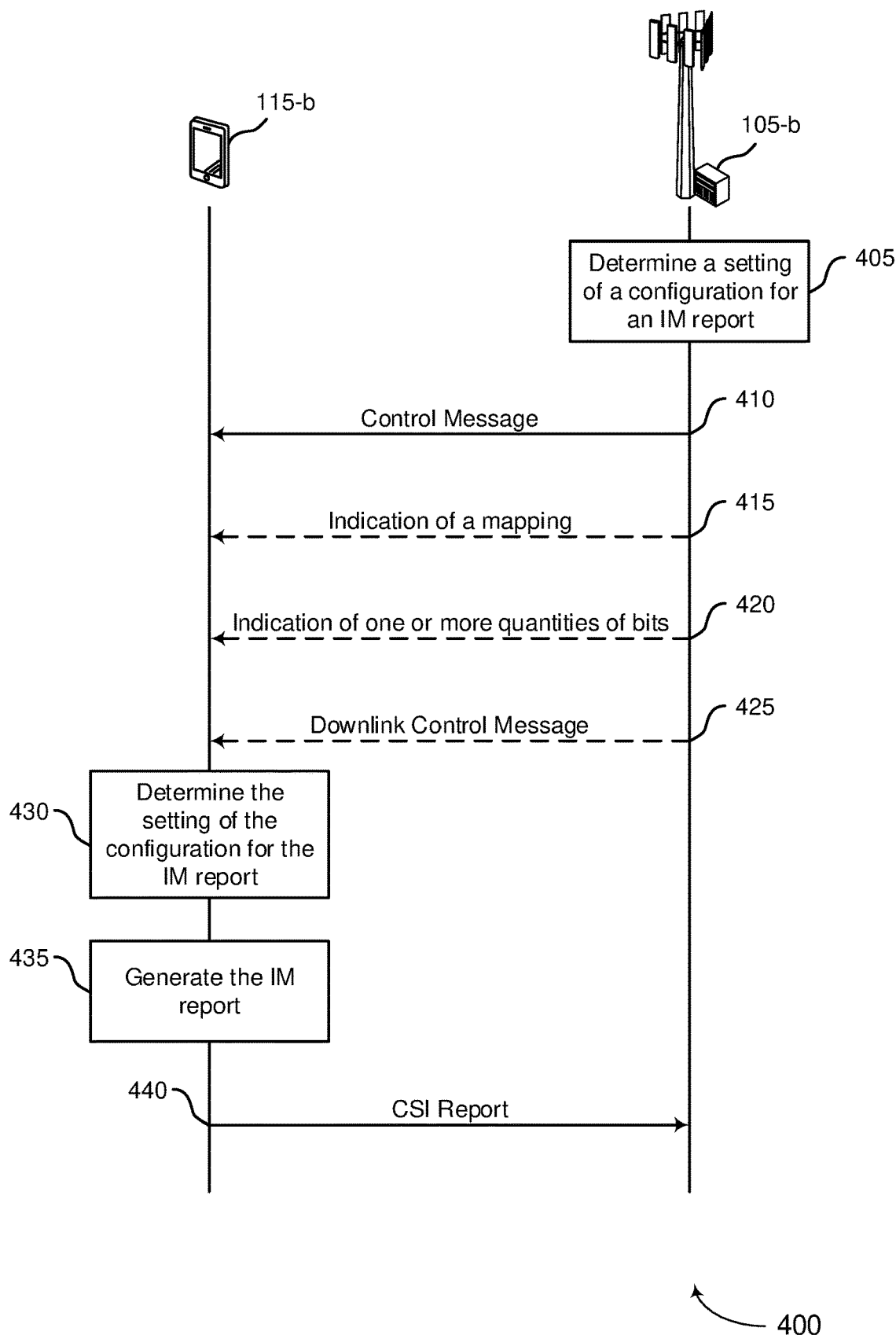
FIG. 4 illustrates an example of a process flow that supports one or more differential modes for interference-specific CSI reporting in accordance with aspects of the present disclosure.

FIG. 4 illustrates an example of a process flow 400 that supports one or more differential modes for interference-specific CSI reporting in accordance with aspects of the present disclosure. In some examples, the process flow 400 may implement aspects of a wireless communications system 100 or a wireless communications system 200. The process flow 400 may include a UE 115-*b* and a base station 105-*b*, which may be examples of the corresponding devices described with reference to FIGS. 1-3. The base station 105-*b* and the UE 115-*b* may implement one or more techniques for reducing overhead associated with an IM report by supporting one or both of a differential resource setting or a differential spatial setting of a configuration for the IM report.

At 405, the base station 105-*b* may determine a setting of a configuration for generating an interference measurement report at a UE. In some examples, the base station 105-*b* may determine the setting based on determining that a downlink channel property, such as a frequency variant property, satisfies a threshold. The threshold may refer to a threshold level of frequency variance or a threshold level of IM information variance across a quantity of subbands of the downlink channel. Additionally or alternatively, the threshold may refer to a threshold level of IM information variance across a quantity of antennas (for example, receive antennas) at the UE 115-*b*. In some other examples, the base station 105-*b* may determine the setting based on receiving a CSI report including a field indicating a request to change the setting to one or both of an absolute or differential resource setting or an absolute or differential spatial setting. In examples in which the setting is a resource setting, the setting may include a wideband IM setting, an absolute subband IM setting, or a differential subband IM setting. In some specific implementations, such a wideband IM setting, an absolute subband IM setting, or a differential subband IM setting may be referred to as a widebandIM setting, a subbandIM_absolute setting, or a subbandIM_differential setting, respectively.

At 410, the base station 105-*b* may transmit, to the UE 115-*b*, a control message including an indication associated with the configuration for generating the IM report in a CSI report. In some implementations, the base station 105-*b* may transmit the control message to the UE 115-*b* via RRC signaling. In some examples, the indication may include information in an im-FormatIndicator field and the configuration may include one or more higher layer parameters, such as a CSI-ReportConfig parameter. The indication may include the setting of the configuration for generating the interference measurement report at the UE and, as such, the indication may include one or both of an absolute or differential resource setting or an absolute or differential spatial setting.

At 415, the base station 105-*b* may, in some implementations, transmit an indication of a mapping to the UE 115-*b*. In some examples, the mapping may include a correspondence between a set of differential values and a set of offset levels that the UE 115-*b* may use to determine differential IM information associated with one or more subbands. In some aspects, the base station 105-*b* may transmit the indication of the mapping to the UE 115-*b* via RRC signaling. Additionally, in some implementations, the base station 105-*b* may adjust or update the mapping via dynamic signaling, such as DCI (for example, the DCI transmitted at 425).

At 420, the base station 105-*b* may, in some implementations, transmit an indication of one or more quantities of bits to the UE 115-*b*. In some aspects, the base station 105-*b* may transmit the one or more quantities of bits to the UE 115-*b* via RRC signaling. In some examples, the base station 105-*b* may transmit an indication of two quantities of bits, such as N1 bits and N2 bits, and the UE 115-*b* may use one of the two quantities of bits (such as the N1 bits) to convey absolute IM information associated with each antenna of one or more subbands and the other of the two quantities of bits (such as the N2 bits) to convey differential IM information associated with each antenna of one or more subbands. In some other examples, the base station 105-*b* may transmit an indication of a single quantity of bits and the UE 115-*b* may use the single quantity of bits to perform uniform quantization across a quantity of antennas at the UE 115-*b* relative to a first antenna (for example, an antenna associated with the lowest interference). In some other examples, the base station 105-*b* may transmit an indication of a quantity of bits for each antenna of the quantity of antennas at the UE 115-*b*. In such examples, the UE 115-*b* may perform non-uniform quantization across the quantity of antennas at the UE 115-*b* relative to the first antenna.

At 425, the base station 105-*b* may, in some implementations, transmit a downlink control message to the UE 115-*b* that includes triggering information associated with the setting of the configuration. In some aspects, the base station 105-*b* may transmit the downlink control message in DCI. In some examples, the downlink control message may dynamically activate or deactivate the setting of the configuration to a differential IM setting (either a differential resource setting or a differential spatial setting, or both). For example, the base station 105-*b* may dynamically activate the setting to the differential IM setting based on determining that a downlink channel property satisfies a threshold or based on receiving a field in a CSI report from the UE 115-*b* indicating a request to activate the setting to the differential IM setting.

At 430, the UE 115-*b* may determine the setting of the configuration for the IM report based on the indication associated with the configuration for the IM report. The UE 115-*b* may determine that the setting includes a resource setting or a spatial setting, or both. In examples in which the setting is a resource setting, the setting may include a wideband IM setting, an absolute subband IM setting, or a differential subband IM setting. In some specific implementations, such a wideband IM setting, an absolute subband IM setting, or a differential subband IM setting may be referred to as a widebandIM setting, a subbandIM_absolute setting, or a subbandIM_differential setting, respectively.

At 435, the UE 115-*b* may generate the IM report based on one or more of the resource setting, the quantity of subbands, the spatial setting, or the quantity of antennas. In some examples, the UE 115-*b* may generate the IM report including differential IM information for at least a subset of the number of subbands or antennas relative to absolute IM information associated with a baseline subband or wideband or a baseline antenna. In some other examples, the UE 115-*b* may generate the IM report including absolute IM information associated with each subband and each antenna.

At 440, the UE 115-*b* may transmit, to the base station 105-*b*, the CSI report including the IM report based on the setting of the configuration for the IM report. In some examples, the UE 115-*b* may transmit the IM report in an IM report-only CSI report (a reduced-size CSI report). In some other examples, the UE 115-*b* may transmit the IM report in the CSI report along with or coupled with one or more other fields. For example, in the case that the setting is a wideband IM setting (widebandIM), the UE 115-*b* may transmit the IM report via a CQI field in the CSI report.

Figure 5:
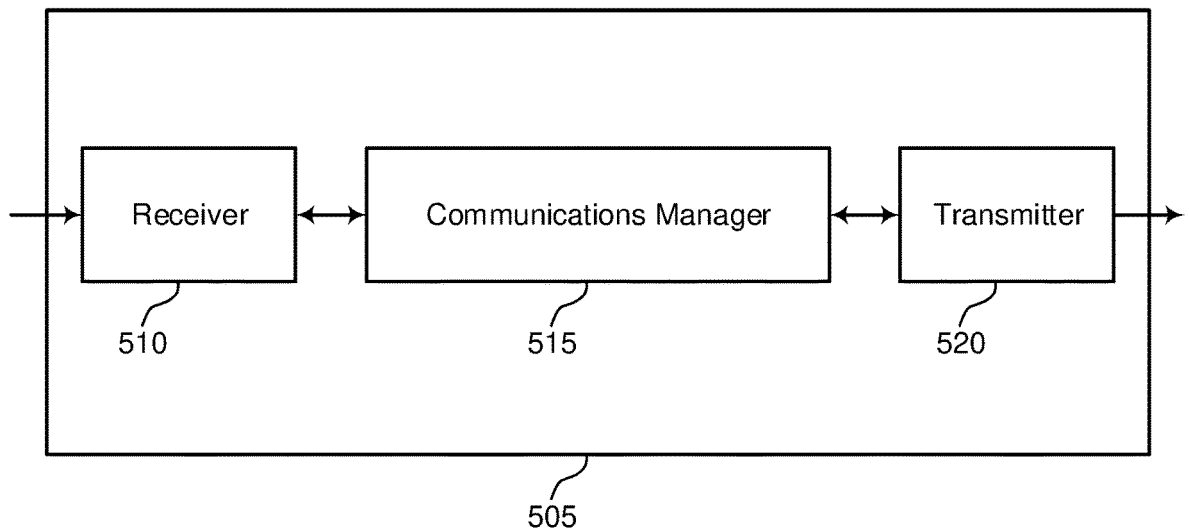
FIGS. 5 and 6 show block diagrams of devices that support one or more differential modes for interference-specific CSI reporting in accordance with aspects of the present disclosure.

FIG. 5 shows a block diagram of a device 505 that supports one or more differential modes for interference-specific CSI reporting in accordance with aspects of the present disclosure. The device 505 may be an example of aspects of a UE 115. The device 505 may include a receiver 510, a communications manager 515, and a transmitter 520. The communications manager 515 can be implemented, at least in part, by one or both of a modem and a processor.

Each of these components may be in communication with one another (for example, via one or more buses).

The receiver 510 may receive information such as packets, user data, or control information associated with various information channels (for example, control channels, data channels, and information related to differential mode for interference-specific CSI report). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a control message including an indication associated with a configuration for an IM report in a CSI report, determine a setting of the configuration for the IM report based on the indication associated with the configuration for the IM report, and transmit, to the base station, the CSI report including the IM report based on the setting of the configuration for the IM report. The communications manager 515 may be an example of aspects of the communications manager 810 described herein.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a set of antennas.

In some examples, the communications manager 515 may be implemented as an integrated circuit or chipset for a mobile device modem, and the receiver 510 and the transmitter 520 may be implemented as analog components (for example, amplifiers, filters, antennas) coupled with the mobile device modem to enable wireless transmission and reception over one or more bands.

The communications manager 515 may be implemented to realize one or more potential advantages. In some implementations of the present disclosure, the communications manager 515 may generate an IM report based on a setting of a configuration for the IM report. In some examples, the setting may account for or otherwise be based on a channel property, such as a frequency variant property. As such, the communications manager 515 may generate the IM report using an efficient amount of uplink resources based on the channel property. Further, the communications manager 515 may determine that the setting includes one or both of a differential resource setting or a differential spatial setting, which may reduce the number of bits that the communications manager 515 may use to generate the IM report and, therefore, may reduce the amount of uplink resources that the communications manager 515 may use to transmit the IM report to a base station 105, which may decrease system overhead and improve the spectral efficiency of the system.

Moreover, by using fewer uplink resources to transmit the IM report, the device 505 may spend less time transmitting, which may enable one or more processing units of the device 505 to enter a sleep mode. Accordingly, the device 505 may potentially improve power savings and increase the battery life of the device 505.

Figure 6:
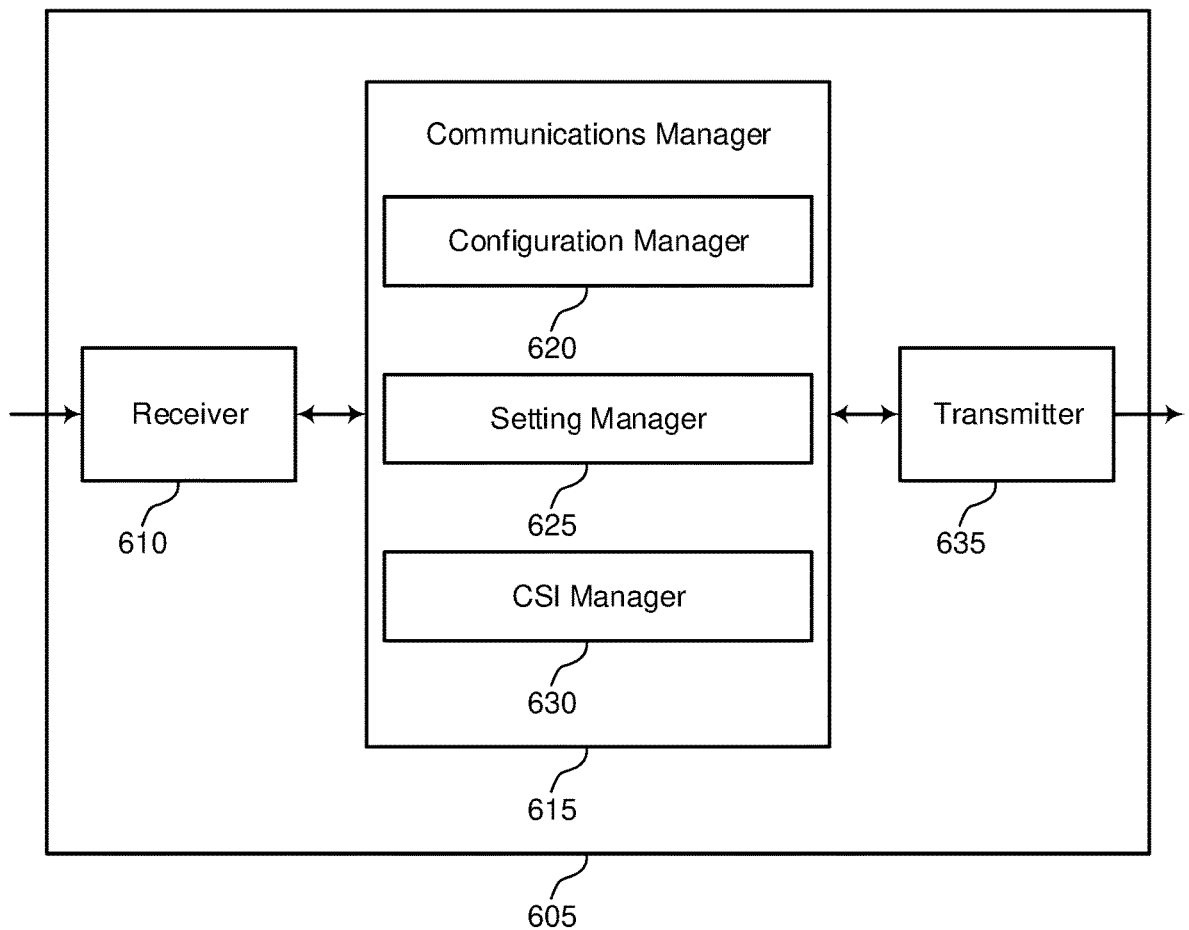

FIG. 6 shows a block diagram of a device 605 that supports one or more differential modes for interference-specific CSI reporting in accordance with aspects of the present disclosure. The device 605 may be an example of aspects of a device 505, or a UE 115. The device 605 may include a receiver 610, a communications manager 615, and a transmitter 635. The communications manager 615 can be implemented, at least in part, by one or both of a modem and a processor. Each of these components may be in communication with one another (for example, via one or more buses).

The receiver 610 may receive information such as packets, user data, or control information associated with various information channels (for example, control channels, data channels, and information related to differential mode for interference-specific CSI report). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515. The communications manager 615 may include a configuration manager 620, a setting manager 625, and a CSI manager 630. The communications manager 615 may be an example of aspects of the communications manager 810 described herein.

The configuration manager 620 may receive, from a base station, a control message including an indication associated with a configuration for an IM report in a CSI report. The setting manager 625 may determine a setting of the configuration for the IM report based on the indication associated with the configuration for the IM report. The CSI manager 630 may transmit, to the base station, the CSI report including the IM report based on the setting of the configuration for the IM report.

The transmitter 635 may transmit signals generated by other components of the device 605. In some examples, the transmitter 635 may be collocated with a receiver 610 in a transceiver component. For example, the transmitter 635 may be an example of aspects of the transceiver 820 described with reference to FIG. 8. The transmitter 635 may utilize a set of antennas.

Figure 7:
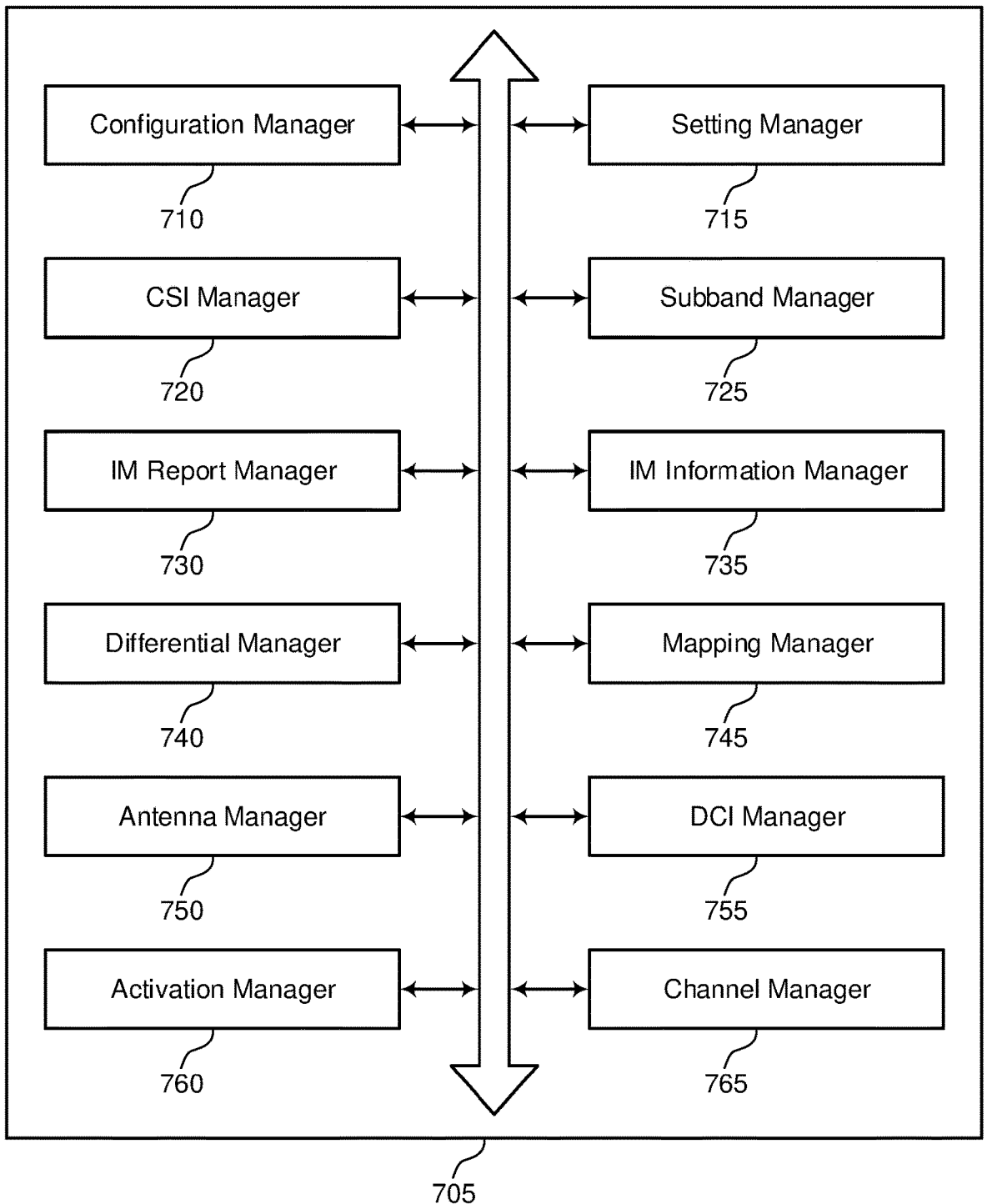
FIG. 7 shows a block diagram of a communications manager that supports one or more differential modes for interference-specific CSI reporting in accordance with aspects of the present disclosure.

FIG. 7 shows a block diagram of a communications manager 705 that supports one or more differential modes for interference-specific CSI reporting in accordance with aspects of the present disclosure. The communications manager 705 may be an example of aspects of a communications manager 515, a communications manager 615, or a communications manager 810 described herein. The communications manager 705 may include a configuration manager 710, a setting manager 715, a CSI manager 720, a subband manager 725, an IM report manager 730, an IM information manager 735, a differential manager 740, a mapping manager 745, an antenna manager 750, a DCI manager 755, an activation manager 760, and a channel manager 765. Each of these components may communicate, directly or indirectly, with one another (for example, via one or more buses).

The configuration manager 710 may receive, from a base station, a control message including an indication associated with a configuration for an IM report in a CSI report.

The setting manager 715 may determine a setting of the configuration for the IM report based on the indication associated with the configuration for the IM report. In some examples, the setting manager 715 may determine to change the setting to one or both of a differential resource setting or a differential spatial setting based on determining that the downlink channel property satisfies the threshold. In some examples, the CSI report includes a field indicating a request to change the setting to one or both of the differential resource setting or the differential spatial setting.

The CSI manager 720 may transmit, to the base station, the CSI report including the IM report based on the setting of the configuration for the IM report.

The subband manager 725 may determine a quantity of subbands associated with the IM report.

The IM report manager 730 may generate the IM report based on the quantity of subbands and the resource setting. In some examples, the IM report manager 730 may transmit the IM report via a CQI field in the CSI report. In some examples, the IM report manager 730 may generate the IM report based on the resource setting, the quantity of subbands, the spatial setting, and a quantity of antennas.

In some examples, the IM report manager 730 may generate the IM report based on the quantity of antennas and the spatial setting. In some examples, the IM report manager 730 may generate the IM report is based on receiving the downlink control message and one or both of the differential resource setting or the differential spatial setting.

The IM information manager 735 may determine first IM information associated with each subband of the quantity of subbands. In some examples, the IM information manager 735 may average the first IM information associated with each subband of the quantity of subbands. In some examples, the IM information manager 735 may determine second IM information associated with each subband of the quantity of subbands based on the average of the first IM information associated with each subband of the quantity of subbands. In some examples, the IM report includes the second IM information associated with each subband of the quantity of subbands and the average of the first IM information associated with each subband of the quantity of subbands.

In some examples, the IM information manager 735 may determine the second IM information associated with each subband of the quantity of subbands based on the resource setting. In some examples, the IM information manager 735 may determine first IM information associated with a first subband of the quantity of subbands. In some examples, the IM information manager 735 may determine second IM information associated with each remaining subband of the quantity of subbands. In some examples, the IM report includes the first IM information associated with the first subband and the second IM information associated with each remaining subband of the quantity of subbands.

In some examples, the IM information manager 735 may determine the first IM information associated with the first subband and the second IM information associated with each remaining subband of the quantity of subbands based on the resource setting. In some examples, the IM information manager 735 may receive, from the base station, an indication of a first quantity of bits and a second quantity of bits, where.

In some examples, the IM information manager 735 may determine IM information associated with a frequency band including the quantity of subbands. In some examples, the IM report includes the IM information. In some examples, the IM information manager 735 may determine first IM information associated with each subband of the quantity of subbands.

In some examples, the IM information manager 735 may average the first IM information associated with each subband of the quantity of subbands. In some examples, the IM information associated with the frequency band including the quantity of subbands includes the average of the first IM information associated with each subband of the quantity of subbands. In some examples, the IM information manager 735 may determine one or both of first complete IM information or first differential IM information associated with each subband of the quantity of subbands based on the resource setting.

In some examples, the IM information manager 735 may determine second differential IM information associated with each antenna of the quantity of antennas based on the spatial setting. In some examples, the IM report includes one or more of the first complete IM information, the first differential IM information, or the second differential IM information.

In some examples, the IM information manager 735 may determine second complete IM information associated with each antenna of the quantity of antennas. In some examples, the IM information manager 735 may determine the second differential IM information associated with each antenna of the quantity of antennas based on a ratio between the second complete IM information associated with each antenna of the quantity of antennas and the second complete IM information associated with a first antenna of the quantity of antennas. In some examples, the IM information manager 735 may determine first IM information associated with each antenna of the quantity of antennas.

In some examples, the IM information manager 735 may determine second IM information associated with each antenna of the quantity of antennas based on a ratio between the first IM information associated with each antenna of the quantity of antennas and the first IM information associated with a first antenna of the quantity of antennas. In some examples, the IM report includes the first IM information associated with the first antenna and the second IM information associated with each antenna of the quantity of antennas.

In some examples, the IM information manager 735 may receive, from the base station, an indication of one or more quantities of bits for determining the second IM information associated with each antenna of the quantity of antennas. In some examples, the IM information manager 735 may determine the second IM information associated with each antenna of the quantity of antennas based on the one or more quantities of bits and a range of IM ratios. In some examples, the range of IM ratios includes the ratio.

In some examples, the IM information manager 735 may receive an indication of a quantity of bits for each antenna of the quantity of antennas. In some examples, the IM information manager 735 may receive the indication of the one or more quantities of bits includes receiving the indication of the one or more quantities of bits via RRC signaling. In some examples, the indication of the one or more quantities of bits indicates only a single quantity of bits.

In some examples, the first IM information includes complete IM information and the second IM information includes differential IM information. In some examples, the first IM information includes complete IM information and the second IM information includes differential IM information relative to the complete IM information. In some examples, the second IM information includes the ratio.

The differential manager 740 may determine an offset level associated with each subband of the quantity of subbands relative to the average of the first IM information associated with each subband of the quantity of subbands. In some examples, differential manager 740 may determine a differential value associated with each subband of the quantity of subbands based on the offset level and a mapping including a correspondence between one or more offset levels and one or more differential values. In some examples, the second IM information includes the differential value.

In some examples, the differential manager 740 may determine an offset level associated with the each remaining subband of the quantity of subbands relative to the first IM information associated with the first subband. In some examples, differential manager 740 may determine a differential value associated with the each remaining subband of the quantity of subbands based on the offset level and a mapping including a correspondence between one or more offset levels and one or more differential values. In some examples, the second IM information includes the differential value.

The mapping manager 745 may receive, from the base station, an indication of the mapping.

The antenna manager 750 may determine a quantity of antennas associated with the IM report.

The DCI manager 755 may receive, from the base station, a downlink control message that includes triggering information associated with the setting of the configuration.

The activation manager 760 may activate the setting of the configuration for the IM report based on the triggering information. In some examples, the setting includes one or both of a differential resource setting or a differential spatial setting, where.

The channel manager 765 may determine that a downlink channel property satisfies a threshold.

Figure 8:
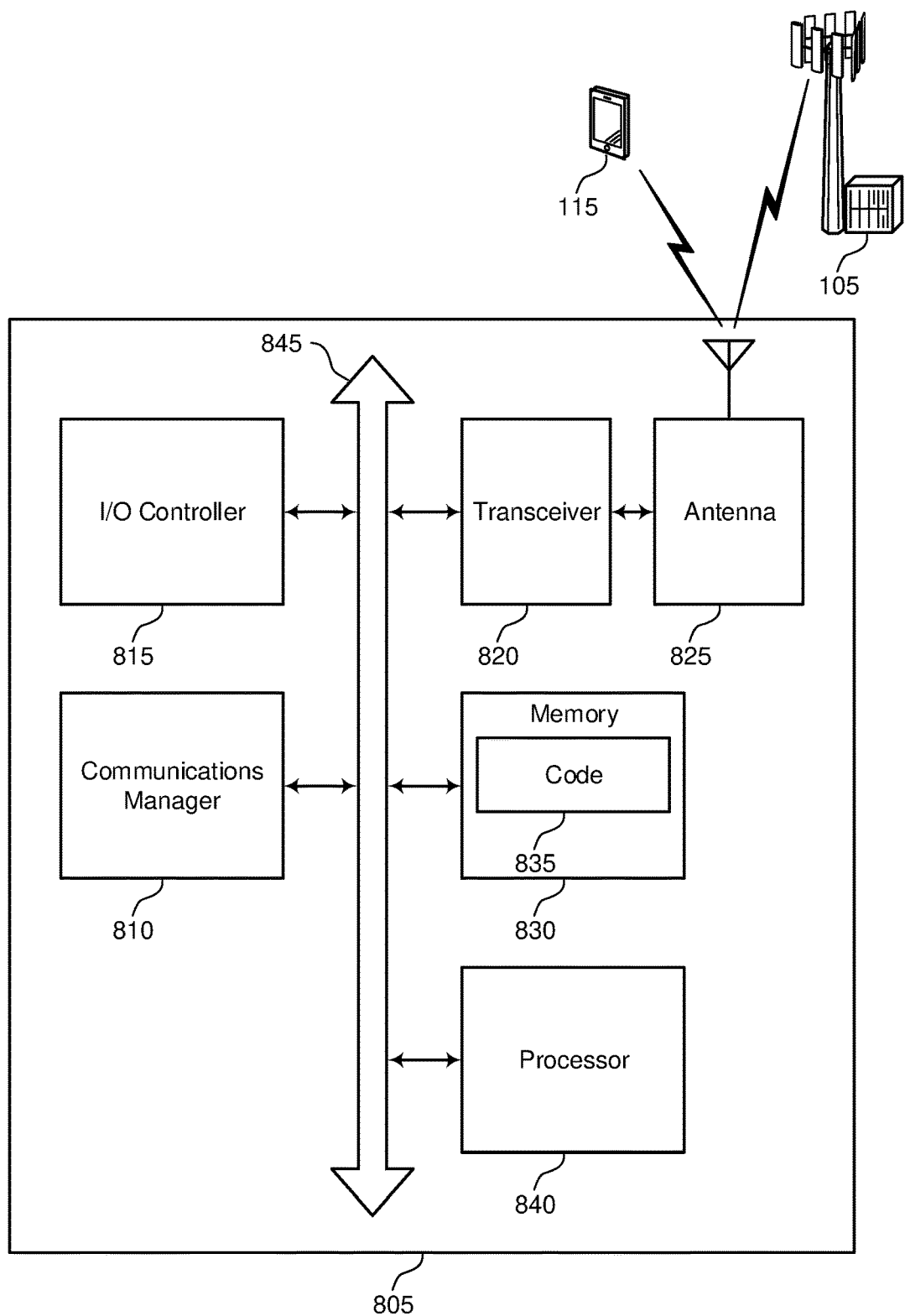
FIG. 8 shows a diagram of a system including a device that supports one or more differential modes for interference-specific CSI reporting in accordance with aspects of the present disclosure.

FIG. 8 shows a diagram of a system including a device 805 that supports one or more differential modes for interference-specific CSI reporting in accordance with aspects of the present disclosure. The device 805 may be an example of or include the components of device 505, device 605, or a UE 115. The device 805 may include components for bi-directional voice and data communications including components for transmitting and receiving communications, including a communications manager 810, an input/output (I/O) controller 815, a transceiver 820, an antenna 825, memory 830, and a processor 840. These components may be in electronic communication via one or more buses (for example, bus 845).

The communications manager 810 may receive, from a base station, a control message including an indication associated with a configuration for an IM report in a CSI report, determine a setting of the configuration for the IM report based on the indication associated with the configuration for the IM report, and transmit, to the base station, the CSI report including the IM report based on the setting of the configuration for the IM report.

The I/O controller 815 may manage input and output signals for the device 805. The I/O controller 815 may also manage peripherals not integrated into the device 805. In some examples, the I/O controller 815 may represent a physical connection or port to an external peripheral. In some examples, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some examples, the I/O controller 815 may be implemented as part of a processor. In some examples, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some examples, the wireless device may include a single antenna 825. However, in some examples the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some examples, the memory 830 may contain, among other things, a basic I/O system (BIOS) which may control basic hardware or software operation such as the interaction with peripheral components or devices.

The processor 840 may include an intelligent hardware device, (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 840 may be configured to operate a memory array using a memory controller. In other cases, a memory controller may be integrated into the processor 840. The processor 840 may be configured to execute computer-readable instructions stored in a memory (for example, the memory 830) to cause the device 805 to perform various functions (for example, functions or tasks supporting differential mode for interference-specific CSI report).

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer (for example, when compiled and executed) to perform functions described herein.

Figure 9:
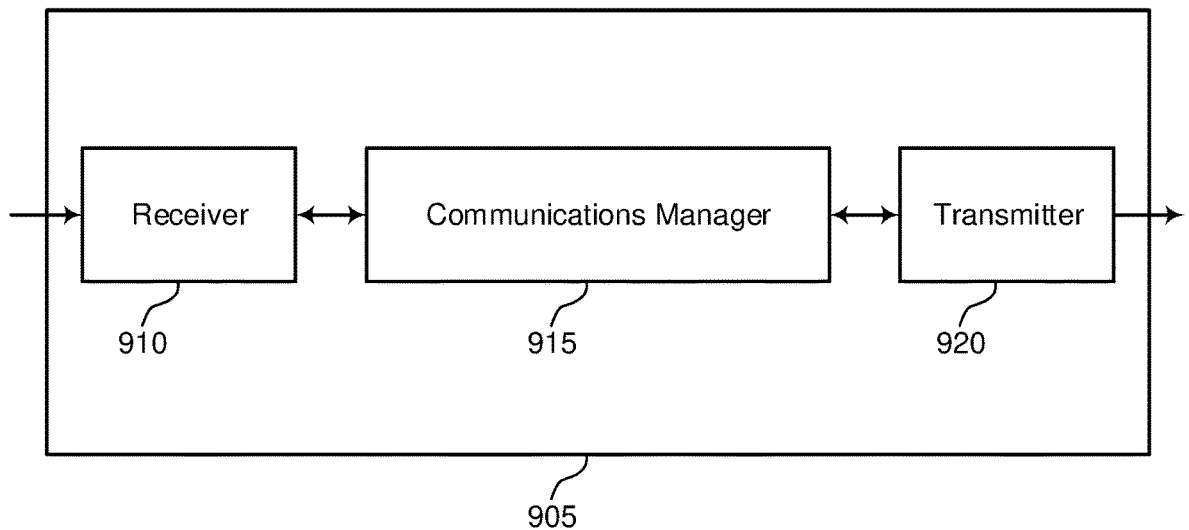
FIGS. 9 and 10 show block diagrams of devices that support one or more differential modes for interference-specific CSI reporting in accordance with aspects of the present disclosure.

FIG. 9 shows a block diagram of a device 905 that supports one or more differential modes for interference-specific CSI reporting in accordance with aspects of the present disclosure. The device 905 may be an example of aspects of a base station 105. The device 905 may include a receiver 910, a communications manager 915, and a transmitter 920. The communications manager 915 can be implemented, at least in part, by one or both of a modem and a processor. Each of these components may be in communication with one another (for example, via one or more buses).

The receiver 910 may receive information such as packets, user data, or control information associated with various information channels (for example, control channels, data channels, and information related to differential mode for interference-specific CSI report). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a setting of a configuration for generating an IM report at a UE, transmit, to the UE, a control message including an indication associated with the configuration for generating the IM report in a CSI report, and receive, from the UE, the CSI report including the IM report based on the setting and transmitting the control message including the indication.

The communications manager 915 may be an example of aspects of the communications manager 1210 described herein.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a set of antennas.

The device 905, based on determining the setting of the configuration for generating the IM report at the UE, may reduce the overhead associated with the CSI report including the IM report, which may improve the spectral efficiency of the system. Further, by implementing one or more of the techniques described herein, the device 905 may have greater flexibility and control of the configuration for generating the IM report and the device 905 may use the greater flexibility and control to more optimally configure the IM report based on a channel property. As such, the device 905 may reduce the overhead of the CSI report including the IM report while also maintaining reliable performance of the CSI reporting procedure.

Figure 10:
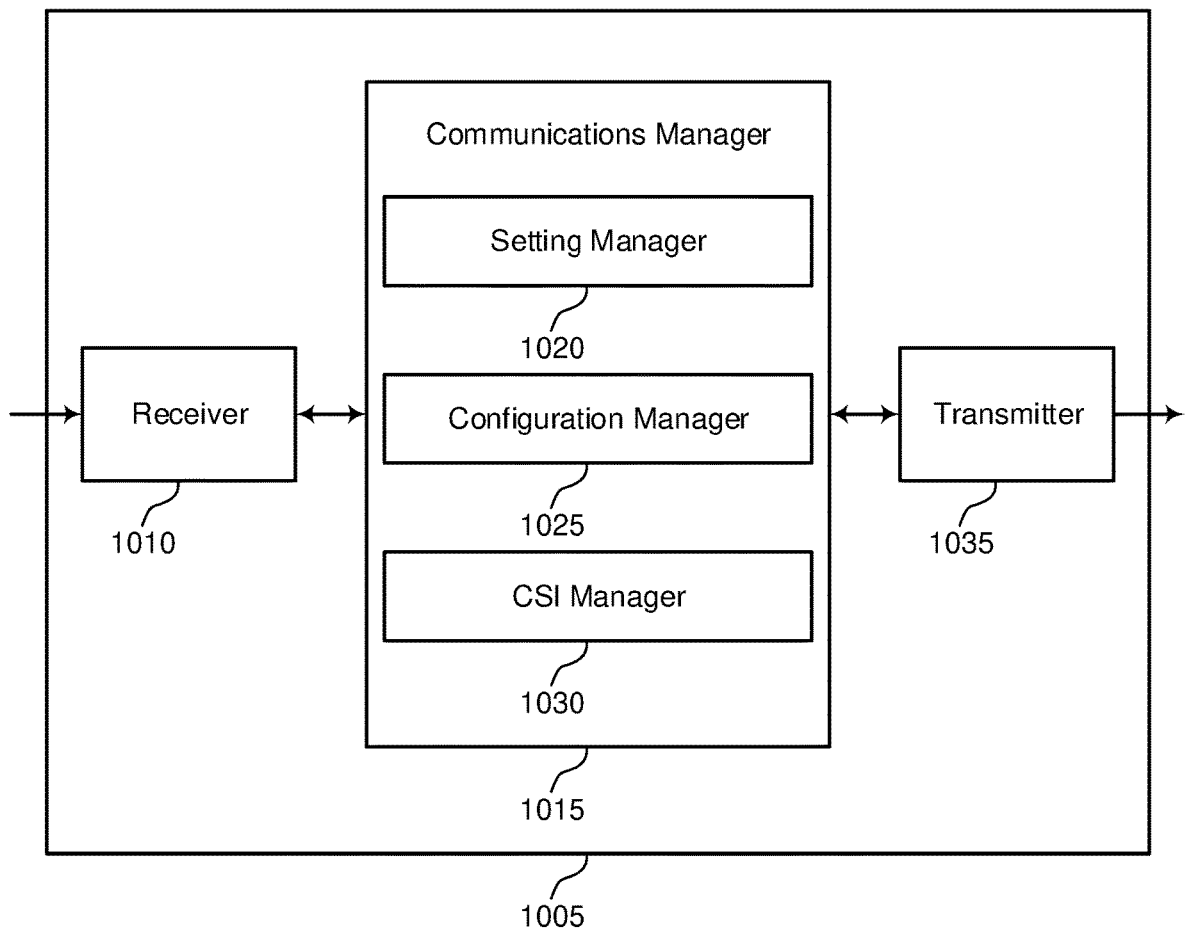

FIG. 10 shows a block diagram of a device 1005 that supports one or more differential modes for interference-specific CSI reporting in accordance with aspects of the present disclosure. The device 1005 may be an example of aspects of a device 905, or a base station 105. The device 1005 may include a receiver 1010, a communications manager 1015, and a transmitter 1035. The communications manager 1015 can be implemented, at least in part, by one or both of a modem and a processor. Each of these components may be in communication with one another (for example, via one or more buses).

The receiver 1010 may receive information such as packets, user data, or control information associated with various information channels (for example, control channels, data channels, and information related to differential mode for interference-specific CSI report). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915. The communications manager 1015 may include a setting manager 1020, a configuration manager 1025, and a CSI manager 1030. The communications manager 1015 may be an example of aspects of the communications manager 1210 described herein.

The setting manager 1020 may determine a setting of a configuration for generating an IM report at a UE. The configuration manager 1025 may transmit, to the UE, a control message including an indication associated with the configuration for generating the IM report in a CSI report. The CSI manager 1030 may receive, from the UE, the CSI report including the IM report based on the setting and transmitting the control message including the indication.

The transmitter 1035 may transmit signals generated by other components of the device 1005. In some examples, the transmitter 1035 may be collocated with a receiver 1010 in a transceiver component. For example, the transmitter 1035 may be an example of aspects of the transceiver 1220 described with reference to FIG. 12. The transmitter 1035 may utilize a set of antennas.

Figure 11:
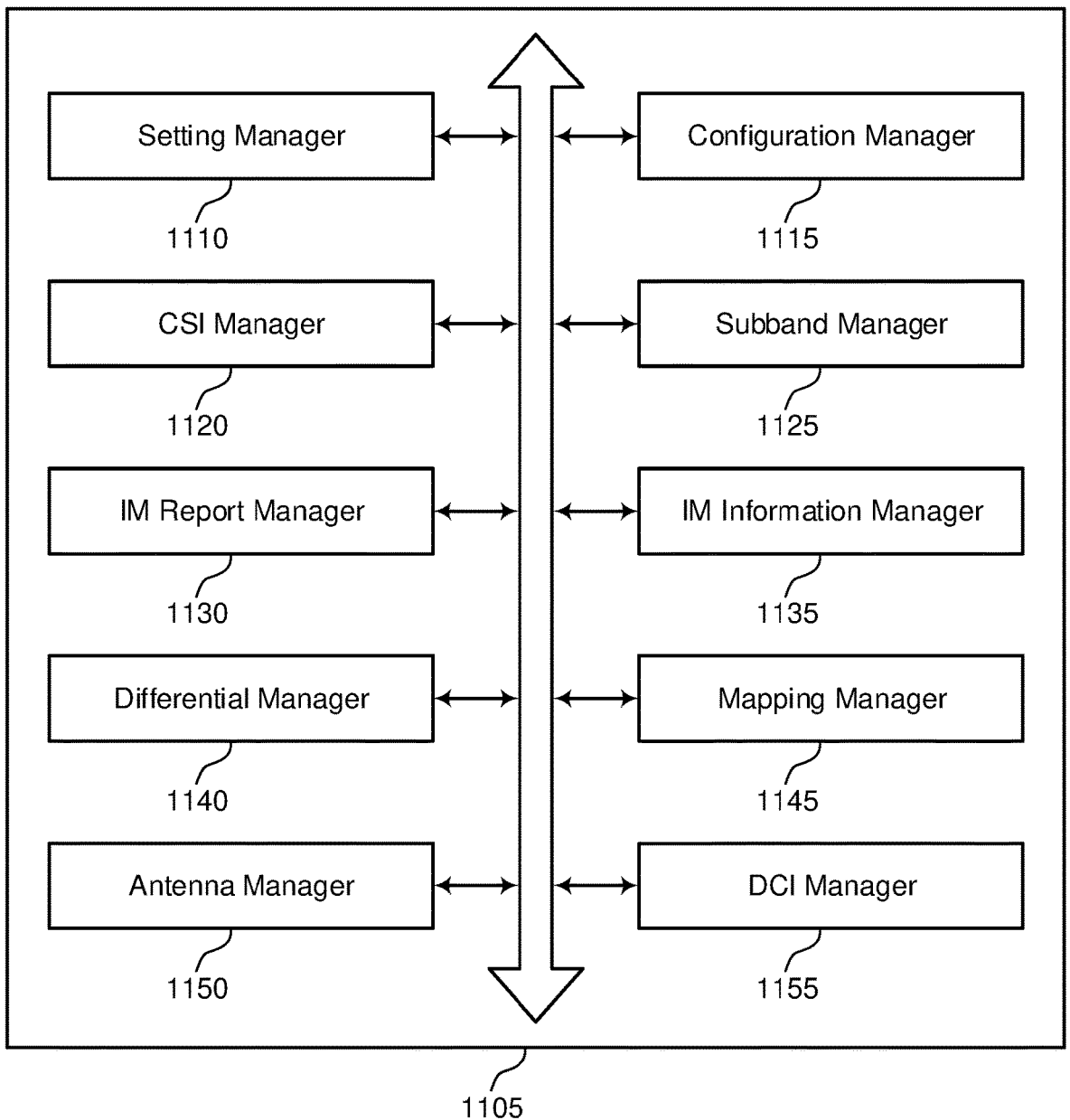
FIG. 11 shows a block diagram of a communications manager that supports one or more differential modes for interference-specific CSI report in accordance with aspects of the present disclosure.

FIG. 11 shows a block diagram of a communications manager 1105 that supports one or more differential modes for interference-specific CSI reporting in accordance with aspects of the present disclosure. The communications manager 1105 may be an example of aspects of a communications manager 915, a communications manager 1015, or a communications manager 1210 described herein. The communications manager 1105 may include a setting manager 1110, a configuration manager 1115, a CSI manager 1120, a subband manager 1125, an IM report manager 1130, an IM information manager 1135, a differential manager 1140, a mapping manager 1145, an antenna manager 1150, and a DCI manager 1155. Each of these components may communicate, directly or indirectly, with one another (for example, via one or more buses).

The setting manager 1110 may determine a setting of a configuration for generating an IM report at a UE.

The configuration manager 1115 may transmit, to the UE, a control message including an indication associated with the configuration for generating the IM report in a CSI report.

The CSI manager 1120 may receive, from the UE, the CSI report including the IM report based on the setting and transmitting the control message including the indication. In some examples, the CSI manager 1120 may receive the CSI report including the IM report based on the quantity of antennas and the spatial setting. In some examples, the CSI manager 1120 may receive, from the UE, the CSI report including a field indicating a request to change the setting to one or both of a differential resource setting or a differential spatial setting. In some examples, determining the setting of the configuration for generating the IM report is based on receiving the CSI report including the field.

The subband manager 1125 may determine a quantity of subbands associated with the IM report.

The IM report manager 1130 may receive the CSI report including the IM report based on the quantity of subbands and the resource setting. In some examples, the IM report manager 1130 may receive the IM report via a CQI field in the CSI report. In some examples, the IM report manager 1130 may receive the IM report based on the resource setting, the quantity of subbands, the spatial setting, and a quantity of antennas.

The IM information manager 1135 may receive, in the IM report, second IM information associated with each subband of the quantity of subbands and an average of first IM information associated with each subband of the quantity of subbands. In some examples, the IM information manager 1135 may determine the first IM information associated with each subband of the quantity of subbands based on the second IM information and the average of the first IM information associated with each subband of the quantity of subbands.

In some examples, the IM information manager 1135 may determine the first IM information associated with each subband of the quantity of subbands based on the offset level and the average of the first IM information associated with each subband of the quantity of subbands. In some examples, the IM information manager 1135 may receive, in the IM report, first IM information associated with a first subband of the quantity of subbands and second IM information associated with each remaining subband of the quantity of subbands.

In some examples, the IM information manager 1135 may determine the first IM information associated with each remaining subband of the quantity of subbands based on the second IM information and the first IM information associated with the first subband. In some examples, the IM information manager 1135 may determine the first IM information associated with each remaining subband of the quantity of subbands based on the offset level and the first IM information associated with the first subband.

In some examples, the IM information manager 1135 may transmit, to the UE, an indication of a first quantity of bits and a second quantity of bits, where. In some examples, the IM information manager 1135 may receive, in the IM report, IM information associated with a frequency band including the quantity of subbands. In some examples, the IM information manager 1135 may determine first IM information associated with each subband of the quantity of subbands based on the IM information associated with the frequency band including the quantity of subbands and a CQI field.

In some examples, the IM information manager 1135 may receive one or both of first complete IM information or first differential IM information associated with each subband of the quantity of subbands based on the resource setting.

In some examples, the IM information manager 1135 may receive second differential IM information associated with each antenna of the quantity of antennas based on the spatial setting. In some examples, the IM report includes one or more of the first complete IM information, the first differential IM information, or the second differential IM information. In some examples, the IM information manager 1135 may receive second IM information associated with each antenna of the quantity of antennas. In some examples, the second IM information includes a ratio between first IM information associated with each antenna of the quantity of antennas and the first IM information associated with a first antenna of the quantity of antennas.

In some examples, the IM information manager 1135 may receive the first IM information associated with the first antenna. In some examples, the IM information manager 1135 may determine the first IM information associated with each antenna of the quantity of antennas based on the ratio and the first IM information associated with the first antenna.

In some examples, the IM information manager 1135 may transmit, to the UE, an indication of one or more quantities of bits for determining the second IM information associated with each antenna of the quantity of antennas. In some examples, the IM information manager 1135 may determine the first IM information associated with each antenna of the quantity of antennas based on one or more of the ratio, the first IM information associated with the first antenna, or the one or more quantities of bits. In some examples, the IM information manager 1135 may transmit an indication of a quantity of bits for each antenna of the quantity of antennas.

In some examples, the IM information manager 1135 may transmit the indication of the one or more quantities of bits includes transmitting the indication of the one or more quantities of bits via RRC signaling. In some examples, the first IM information includes complete IM information and the second IM information includes differential IM information relative to the complete IM information. In some examples, the first IM information includes complete IM information.

In some examples, the indication of the one or more quantities of bits indicates only a single quantity of bits. In some examples, the first IM information includes complete IM information and the second IM information includes differential IM information.

The differential manager 1140 may determine a differential value associated with each subband of the quantity of subbands, In some examples, the second IM information includes the differential value. In some examples, the differential manager 1140 may determine an offset level associated with each subband of the quantity of subbands relative to the average of the first IM information associated with each subband of the quantity of subbands based on the differential value and a mapping including a correspondence between one or more offset levels and one or more differential values.

In some examples, the differential manager 1140 may determine a differential value associated with each remaining subband of the quantity of subbands. In some examples, the second IM information includes the differential value. In some examples, the differential manager 1140 may determine an offset level associated with each remaining subband of the quantity of subbands relative to the first IM information associated with the first subband based on the differential value and a mapping including a correspondence between one or more offset levels and one or more differential values.

The mapping manager 1145 may transmit, to the UE, an indication of the mapping.

The antenna manager 1150 may determine a quantity of antennas associated with the IM report.

The DCI manager 1155 may transmit, to the UE, a downlink control message that includes triggering information associated with the setting of the configuration. In some examples, the setting includes one or both of a differential resource setting or a differential spatial setting.

Figure 12:
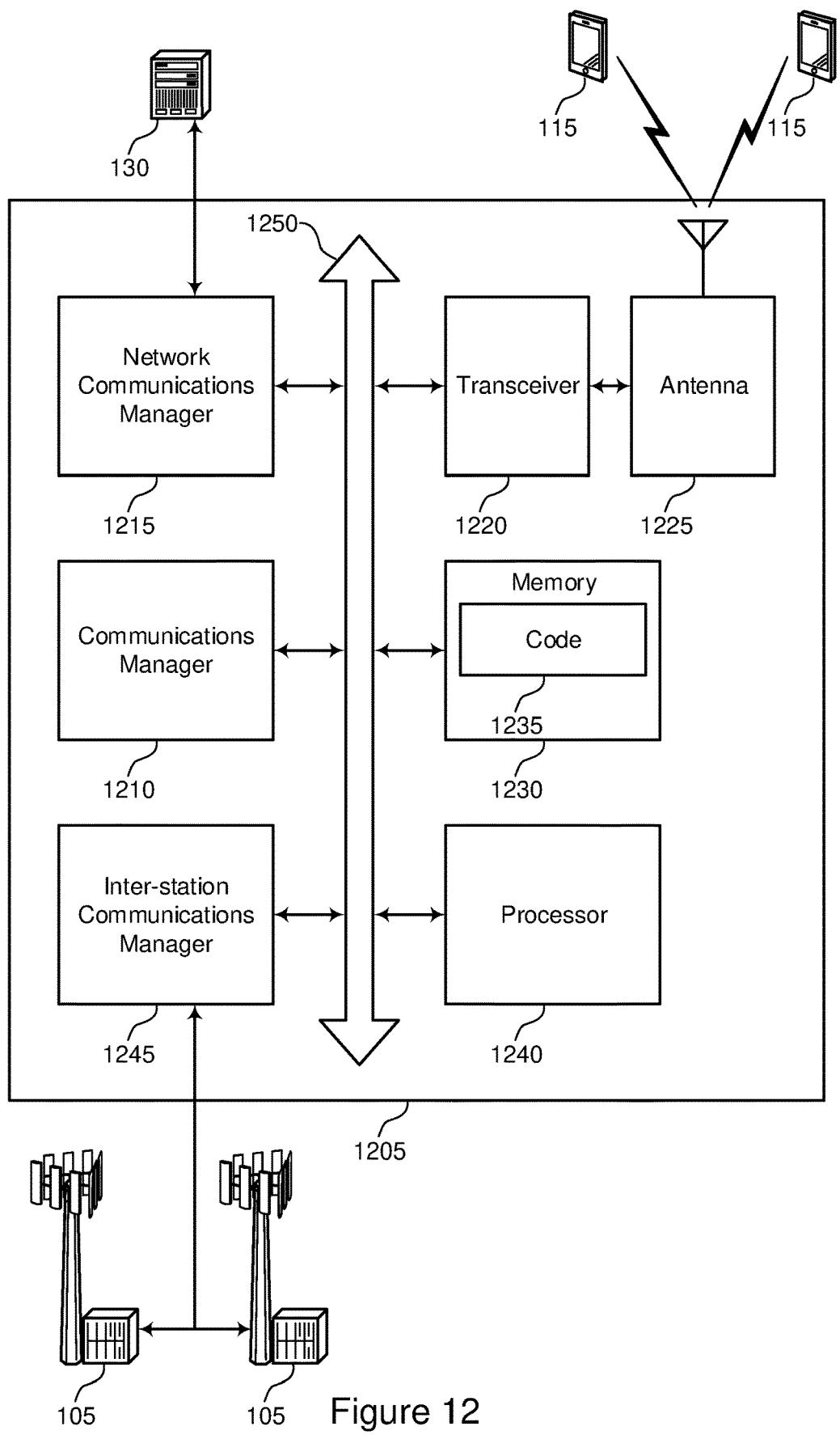
FIG. 12 shows a diagram of a system including a device that supports one or more differential modes for interference-specific CSI reporting in accordance with aspects of the present disclosure.

FIG. 12 shows a diagram of a system including a device 1205 that supports one or more differential modes for interference-specific CSI reporting in accordance with aspects of the present disclosure. The device 1205 may be an example of or include the components of device 905, device 1005, or a base station 105. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (for example, bus 1250).

The communications manager 1210 may determine a setting of a configuration for generating an IM report at a UE, transmit, to the UE, a control message including an indication associated with the configuration for generating the IM report in a CSI report, and receive, from the UE, the CSI report including the IM report based on the setting and transmitting the control message including the indication.

The network communications manager 1215 may manage communications with the core network (for example, via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some examples, the wireless device may include a single antenna 1225. However, in some examples the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (for example, the processor 1240) cause the device to perform various functions described herein. In some examples, the memory 1230 may contain, among other things, a BIOS which may control basic hardware or software operation such as the interaction with peripheral components or devices.

The processor 1240 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1240 may be configured to operate a memory array using a memory controller. In some examples, a memory controller may be integrated into processor 1240. The processor 1240 may be configured to execute computer-readable instructions stored in a memory (for example, the memory 1230) to cause the device 1205 to perform various functions (for example, functions or tasks supporting differential mode for interference-specific CSI report).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some examples, the code 1235 may not be directly executable by the processor 1240 but may cause a computer (for example, when compiled and executed) to perform functions described herein.

Figure 13:
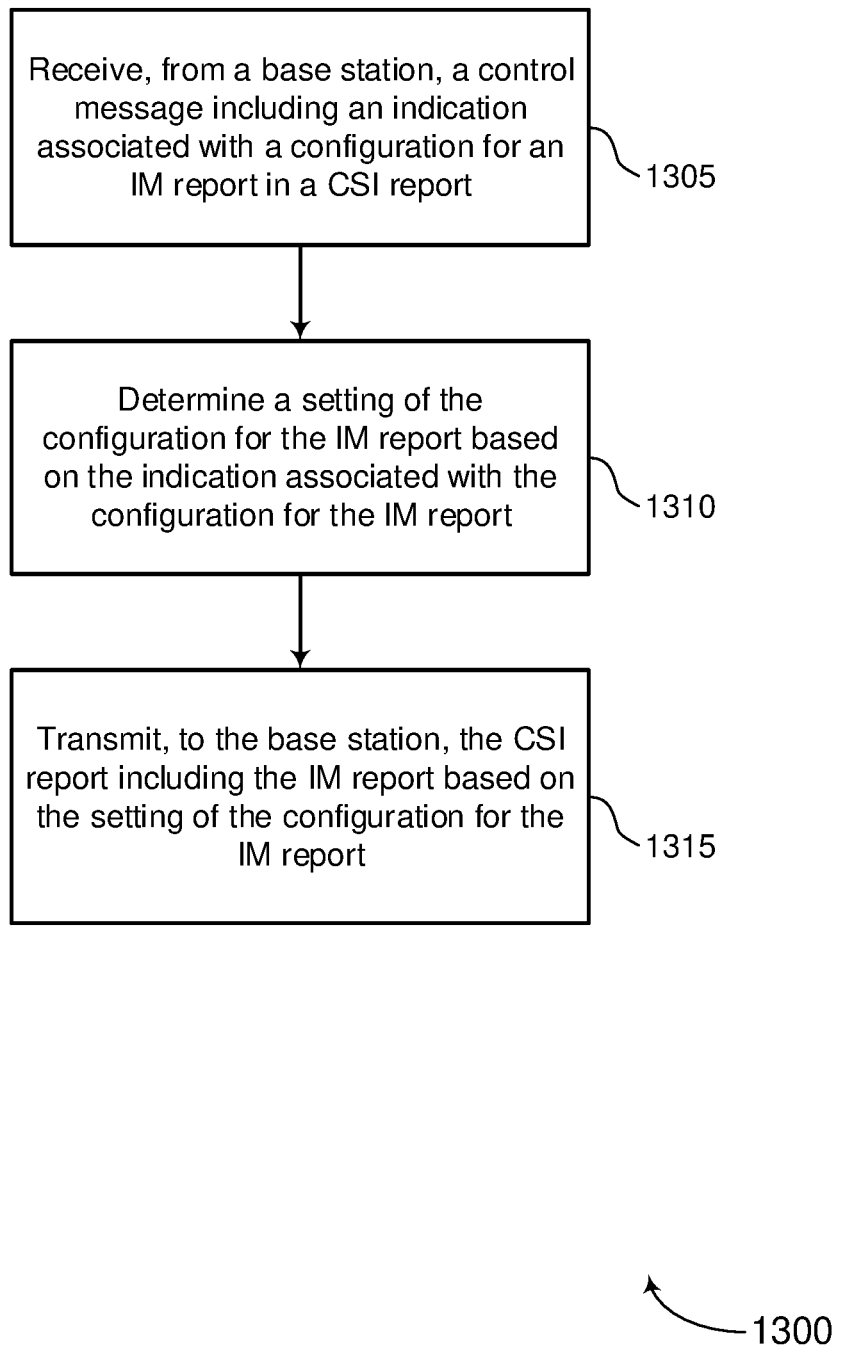
FIGS. 13 through 16 show flowcharts illustrating methods that support one or more differential modes for interference-specific CSI reporting in accordance with aspects of the present disclosure.

FIG. 13 shows a flowchart illustrating a method 1300 that supports one or more differential modes for interference-specific CSI reporting in accordance with aspects of the present disclosure. The operations of method 1300 may be implemented by a UE 115 or its components. For example, the operations of method 1300 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a control message including an indication associated with a configuration for an IM report in a CSI report. The operations of 1305 may be performed according to the methods described herein. In some examples, aspects of the operations of 1305 may be performed by a configuration manager as described with reference to FIGS. 5-8.

At 1310, the UE may determine a setting of the configuration for the IM report based on the indication associated with the configuration for the IM report. The operations of 1310 may be performed according to the methods described herein. In some examples, aspects of the operations of 1310 may be performed by a setting manager as described with reference to FIGS. 5-8.

At 1315, the UE may transmit, to the base station, the CSI report including the IM report based on the setting of the configuration for the IM report. The operations of 1315 may be performed according to the methods described herein. In some examples, aspects of the operations of 1315 may be performed by a CSI manager as described with reference to FIGS. 5-8.

Figure 14:
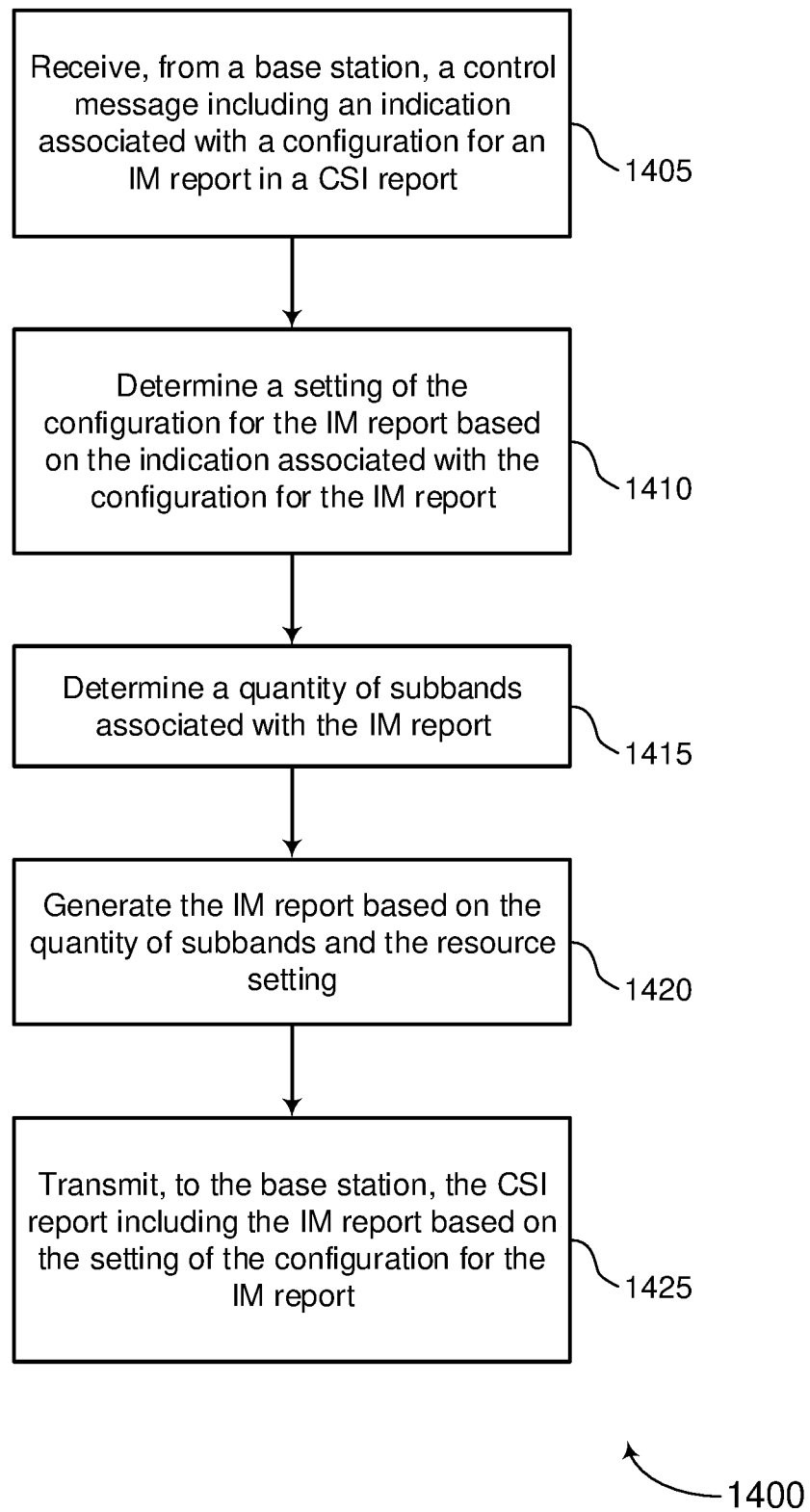

FIG. 14 shows a flowchart illustrating a method 1400 that supports one or more differential modes for interference-specific CSI reporting in accordance with aspects of the present disclosure. The operations of method 1400 may be implemented by a UE 115 or its components. For example, the operations of method 1400 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a control message including an indication associated with a configuration for an IM report in a CSI report. The operations of 1405 may be performed according to the methods described herein. In some examples, aspects of the operations of 1405 may be performed by a configuration manager as described with reference to FIGS. 5-8.

At 1410, the UE may determine a setting of the configuration for the IM report based on the indication associated with the configuration for the IM report. The operations of 1410 may be performed according to the methods described herein. In some examples, aspects of the operations of 1410 may be performed by a setting manager as described with reference to FIGS. 5-8.

At 1415, the UE may determine a quantity of subbands associated with the IM report. The operations of 1415 may be performed according to the methods described herein. In some examples, aspects of the operations of 1415 may be performed by a subband manager as described with reference to FIGS. 5-8.

At 1420, the UE may generate the IM report based on the quantity of subbands and the resource setting. The operations of 1420 may be performed according to the methods described herein. In some examples, aspects of the operations of 1420 may be performed by an IM report manager as described with reference to FIGS. 5-8.

At 1425, the UE may transmit, to the base station, the CSI report including the IM report based on the setting of the configuration for the IM report. The operations of 1425 may be performed according to the methods described herein. In some examples, aspects of the operations of 1425 may be performed by a CSI manager as described with reference to FIGS. 5-8.

Figure 15:
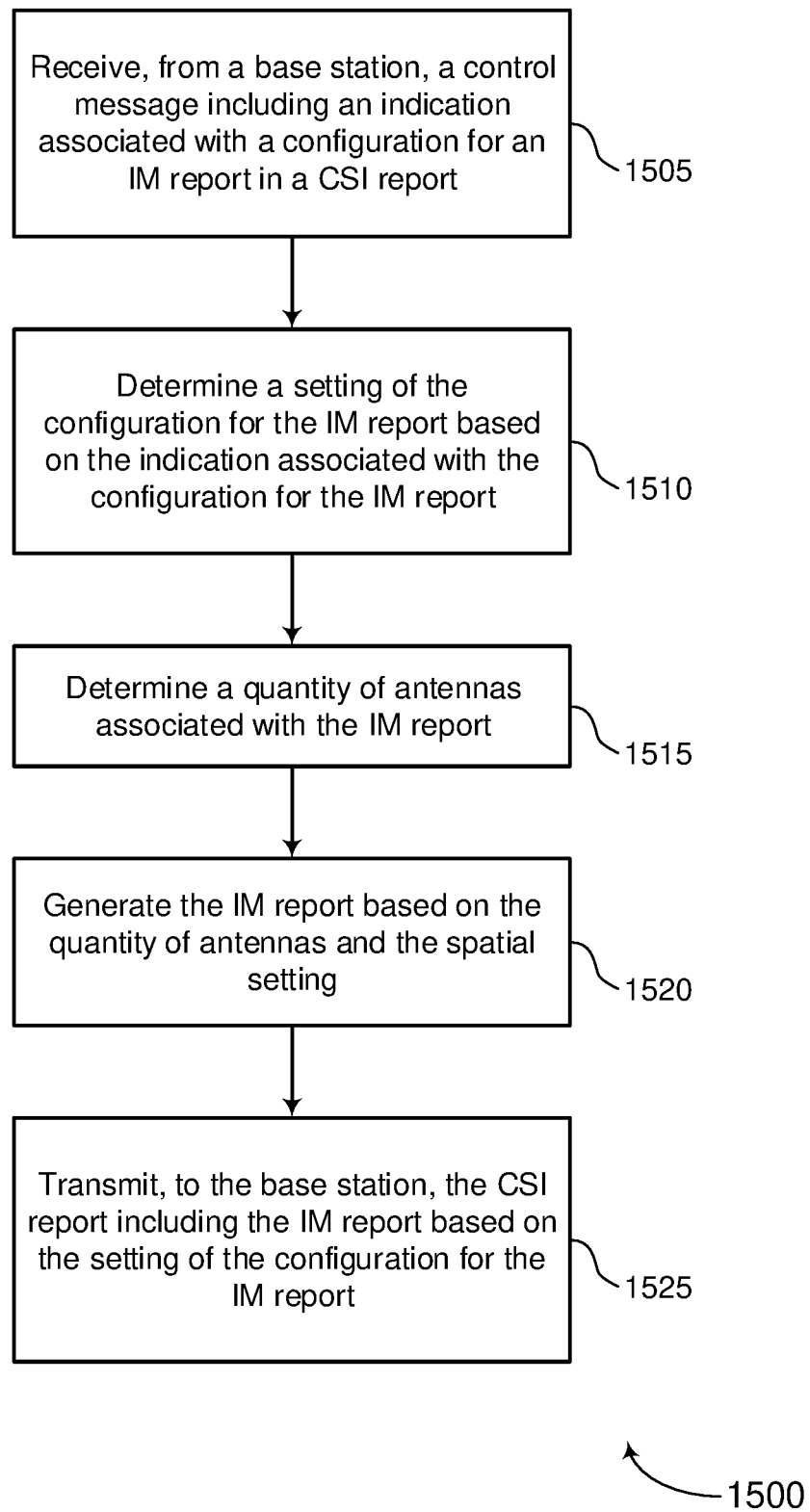

FIG. 15 shows a flowchart illustrating a method 1500 that supports one or more differential modes for interference-specific CSI reporting in accordance with aspects of the present disclosure. The operations of method 1500 may be implemented by a UE 115 or its components. For example, the operations of method 1500 may be performed by a communications manager as described with reference to FIGS. 5-8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a control message including an indication associated with a configuration for an IM report in a CSI report. The operations of 1505 may be performed according to the methods described herein. In some examples, aspects of the operations of 1505 may be performed by a configuration manager as described with reference to FIGS. 5-8.

At 1510, the UE may determine a setting of the configuration for the IM report based on the indication associated with the configuration for the IM report. The operations of 1510 may be performed according to the methods described herein. In some examples, aspects of the operations of 1510 may be performed by a setting manager as described with reference to FIGS. 5-8.

At 1515, the UE may determine a quantity of antennas associated with the IM report. The operations of 1515 may be performed according to the methods described herein. In some examples, aspects of the operations of 1515 may be performed by an antenna manager as described with reference to FIGS. 5-8.

At 1520, the UE may generate the IM report based on the quantity of antennas and the spatial setting. The operations of 1520 may be performed according to the methods described herein. In some examples, aspects of the operations of 1520 may be performed by an IM report manager as described with reference to FIGS. 5-8.

At 1525, the UE may transmit, to the base station, the CSI report including the IM report based on the setting of the configuration for the IM report. The operations of 1525 may be performed according to the methods described herein. In some examples, aspects of the operations of 1525 may be performed by a CSI manager as described with reference to FIGS. 5-8.

Figure 16:
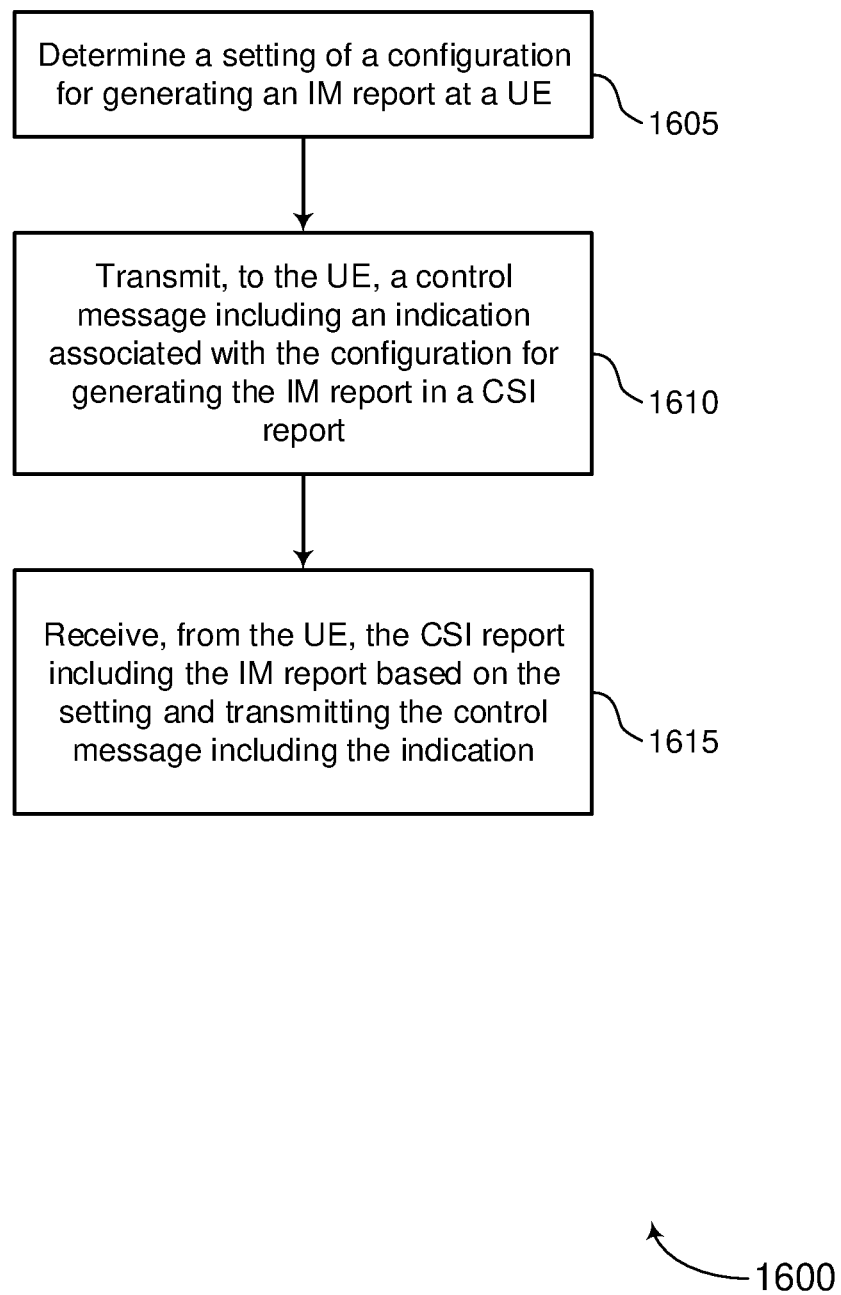

FIG. 16 shows a flowchart illustrating a method 1600 that supports one or more differential modes for interference-specific CSI reporting in accordance with aspects of the present disclosure. The operations of method 1600 may be implemented by a base station 105 or its components. For example, the operations of method 1600 may be performed by a communications manager as described with reference to FIGS. 9-12. In some examples, a base station may execute a set of instructions to control the functional elements of the base station to perform the functions described below. Additionally or alternatively, a base station may perform aspects of the functions described below using special-purpose hardware.

At 1605, the base station may determine a setting of a configuration for generating an IM report at a UE. The operations of 1605 may be performed according to the methods described herein. In some examples, aspects of the operations of 1605 may be performed by a setting manager as described with reference to FIGS. 9-12.

At 1610, the base station may transmit, to the UE, a control message including an indication associated with the configuration for generating the IM report in a CSI report. The operations of 1610 may be performed according to the methods described herein. In some examples, aspects of the operations of 1610 may be performed by a configuration manager as described with reference to FIGS. 9-12.

At 1615, the base station may receive, from the UE, the CSI report including the IM report based on the setting and transmitting the control message including the indication. The operations of 1615 may be performed according to the methods described herein. In some examples, aspects of the operations of 1615 may be performed by a CSI manager as described with reference to FIGS. 9-12.

It is noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. In some examples, disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a control message comprising an indication associated with a configuration for an interference measurement report in a channel state information report, wherein a setting of the configuration for the interference measurement report is based at least in part on the indication associated with the configuration for the interference measurement report, and wherein the setting comprises at least one of a resource setting associated with a quantity of subbands or a spatial setting associated with a quantity of antennas; and
   transmitting the channel state information report including the interference measurement report, wherein the interference measurement report is based at least in part on the setting of the configuration for the interference measurement report and based at least in part on at least one of the quantity of subbands or the quantity of antennas.

2. The method of claim 1, wherein the setting comprises the resource setting, the method further comprising:
   determining the quantity of subbands associated with the interference measurement report; and
   generating the interference measurement report based at least in part on the quantity of subbands and the resource setting.

3. The method of claim 2, wherein generating the interference measurement report further comprises:
   determining first interference measurement information associated with each subband of the quantity of subbands;
   averaging the first interference measurement information associated with each subband of the quantity of subbands; and
   determining second interference measurement information associated with each subband of the quantity of subbands based at least in part on an average of the first interference measurement information associated with each subband of the quantity of subbands, wherein the interference measurement report comprises the second interference measurement information associated with each subband of the quantity of subbands and the average of the first interference measurement information associated with each subband of the quantity of subbands.

4. The method of claim 3, wherein determining the second interference measurement information associated with each subband of the quantity of subbands further comprises:
   determining an offset level associated with each subband of the quantity of subbands relative to the average of the first interference measurement information associated with each subband of the quantity of subbands; and
   determining a differential value associated with each subband of the quantity of subbands based at least in part on the offset level and a mapping comprising a correspondence between one or more offset levels and one or more differential values, wherein the second interference measurement information comprises the differential value.

5. The method of claim 4, further comprising:
   receiving an indication of the mapping.

6. The method of claim 3, further comprising determining the second interference measurement information associated with each subband of the quantity of subbands based at least in part on the resource setting.

7. The method of claim 3, wherein the first interference measurement information comprises complete interference measurement information and the second interference measurement information comprises differential interference measurement information relative to the complete interference measurement information.

8. The method of claim 2, wherein generating the interference measurement report further comprises:
determining first interference measurement information associated with a first subband of the quantity of subbands; and
determining second interference measurement information associated with each remaining subband of the quantity of subbands, wherein the interference measurement report comprises the first interference measurement information associated with the first subband and the second interference measurement information associated with each remaining subband of the quantity of subbands.

9. The method of claim 8, wherein determining the second interference measurement information associated with each remaining subband of the quantity of subbands further comprises:
determining an offset level associated with the each remaining subband of the quantity of subbands relative to the first interference measurement information associated with the first subband; and
determining a differential value associated with the each remaining subband of the quantity of subbands based at least in part on the offset level and a mapping comprising a correspondence between one or more offset levels and one or more differential values, wherein the second interference measurement information comprises the differential value.

10. The method of claim 9, further comprising:
receiving an indication of the mapping.

11. The method of claim 8, further comprising determining the first interference measurement information associated with the first subband and the second interference measurement information associated with each remaining subband of the quantity of subbands based at least in part on the resource setting.

12. The method of claim 8, further comprising:
receiving an indication of a first quantity of bits and a second quantity of bits, wherein:
the first interference measurement information associated with the first subband comprises the first quantity of bits; and
the second interference measurement information associated with each remaining subband of the quantity of subbands comprises the second quantity of bits.

13. The method of claim 8, wherein the first interference measurement information comprises complete interference measurement information and the second interference measurement information comprises differential interference measurement information relative to the complete interference measurement information.

14. The method of claim 2, wherein transmitting the interference measurement report in the channel state information report further comprises transmitting the interference measurement report via a channel quality indicator field in the channel state information report.

15. The method of claim 2, wherein generating the interference measurement report further comprises determining interference measurement information associated with a frequency band comprising the quantity of subbands, wherein the interference measurement report comprises the interference measurement information.

16. The method of claim 15, wherein determining the interference measurement information associated with the frequency band comprising the quantity of subbands further comprises:
determining first interference measurement information associated with each subband of the quantity of subbands; and
averaging the first interference measurement information associated with each subband of the quantity of subbands, wherein the interference measurement information associated with the frequency band comprising the quantity of subbands comprises an average of the first interference measurement information associated with each subband of the quantity of subbands.

17. The method of claim 16, wherein the first interference measurement information comprises complete interference measurement information.

18. The method of claim 2, wherein the setting further comprises the spatial setting, the method further comprising generating the interference measurement report based at least in part on the resource setting, the quantity of subbands, the spatial setting, and the quantity of antennas.

19. The method of claim 18, wherein generating the interference measurement report further comprises:
determining one or both of first complete interference measurement information or first differential interference measurement information associated with each subband of the quantity of subbands based at least in part on the resource setting; and
determining second differential interference measurement information associated with each antenna of the quantity of antennas based at least in part on the spatial setting, wherein the interference measurement report comprises one or more of the first complete interference measurement information, the first differential interference measurement information, or the second differential interference measurement information.

20. The method of claim 19, further comprising:
determining second complete interference measurement information associated with each antenna of the quantity of antennas; and
determining the second differential interference measurement information associated with each antenna of the quantity of antennas based at least in part on a ratio between the second complete interference measurement information associated with each antenna of the quantity of antennas and the second complete interference measurement information associated with a first antenna of the quantity of antennas.

21. The method of claim 1, wherein the setting comprises the spatial setting, the method further comprising:
determining the quantity of antennas associated with the interference measurement report; and
generating the interference measurement report based at least in part on the quantity of antennas and the spatial setting.

22. The method of claim 21, wherein generating the interference measurement report further comprises:
determining first interference measurement information associated with each antenna of the quantity of antennas; and
determining second interference measurement information associated with each antenna of the quantity of antennas based at least in part on a ratio between the first interference measurement information associated with each antenna of the quantity of antennas and the first interference measurement information associated with a first antenna of the quantity of antennas, wherein the interference measurement report comprises the first interference measurement information associated with the first antenna and the second interference measurement information associated with each antenna of the quantity of antennas.

23. The method of claim 22, wherein the second interference measurement information comprises the ratio.

24. The method of claim 22, further comprising:
receiving an indication of one or more quantities of bits for determining the second interference measurement information associated with each antenna of the quantity of antennas; and
determining the second interference measurement information associated with each antenna of the quantity of antennas based at least in part on the one or more quantities of bits and a range of interference measurement ratios, wherein the range of interference measurement ratios comprises the ratio.

25. The method of claim 24, wherein the indication of the one or more quantities of bits indicates only a single quantity of bits.

26. The method of claim 24, wherein receiving the indication of the one or more quantities of bits for determining the second interference measurement information associated with each antenna of the quantity of antennas comprises receiving an indication of a quantity of bits for each antenna of the quantity of antennas.

27. The method of claim 24, wherein receiving the indication of the one or more quantities of bits comprises receiving the indication of the one or more quantities of bits via radio resource control signaling.

28. The method of claim 22, wherein the first interference measurement information comprises complete interference measurement information and the second interference measurement information comprises differential interference measurement information.

29. A method for wireless communication at a network device, comprising:
transmitting a control message comprising an indication associated with a configuration for generating an interference measurement report in a channel state information report, wherein a setting of the configuration for generating the interference measurement report comprises at least one of a resource setting associated with a quantity of subbands or a spatial setting associated with a quantity of antennas; and
receiving the channel state information report including the interference measurement report, wherein the interference measurement report is based at least in part on the setting of the configuration for generating the interference measurement report and based at least in part on at least one of the quantity of subbands or the quantity of antennas.

30. The method of claim 29, wherein the setting comprises the resource setting, the method further comprising:
determining the quantity of subbands associated with the interference measurement report; and
receiving the channel state information report including the interference measurement report based at least in part on the quantity of subbands and the resource setting.

31. The method of claim 30, further comprising:
receiving, in the interference measurement report, second interference measurement information associated with each subband of the quantity of subbands and an average of first interference measurement information associated with each subband of the quantity of subbands; and
determining the first interference measurement information associated with each subband of the quantity of subbands based at least in part on the second interference measurement information and the average of the first interference measurement information associated with each subband of the quantity of subbands.

32. An apparatus for wireless communication at a user equipment (UE), comprising:
means for receiving a control message comprising an indication associated with a configuration for an interference measurement report in a channel state information report, wherein a setting of the configuration for the interference measurement report is based at least in part on the indication associated with the configuration for the interference measurement report, and wherein the setting comprises at least one of a resource setting associated with a quantity of subbands or a spatial setting associated with a quantity of antennas; and
means for transmitting the channel state information report including the interference measurement report, wherein the interference measurement report is based at least in part on the setting of the configuration for the interference measurement report and based at least in part on at least one of the quantity of subbands or the quantity of antennas.

33. The apparatus of claim 32, wherein the setting comprises the resource setting, the apparatus further comprising:
means for determining the quantity of subbands associated with the interference measurement report; and
means for generating the interference measurement report based at least in part on the quantity of subbands and the resource setting.

34. An apparatus for wireless communication at a network device, comprising:
means for transmitting a control message comprising an indication associated with a configuration for generating an interference measurement report in a channel state information report, wherein a setting of the configuration for generating the interference measurement report comprises at least one of a resource setting associated with a quantity of subbands or a spatial setting associated with a quantity of antennas; and
means for receiving the channel state information report including the interference measurement report, wherein the interference measurement report is based at least in part on the setting of the configuration for generating the interference measurement report and based at least in part on at least one of the quantity of subbands or the quantity of antennas.

35. The apparatus of claim 34, wherein the setting comprises the resource setting, the apparatus further comprising:
means for determining the quantity of subbands associated with the interference measurement report; and
means for receiving the channel state information report including the interference measurement report based at least in part on the quantity of subbands and the resource setting.

* * * * *